(12) United States Patent
Nugent

(10) Patent No.: US 8,332,339 B2
(45) Date of Patent: Dec. 11, 2012

(54) WATERSHED MEMORY SYSTEMS AND METHODS

(75) Inventor: Alex Nugent, Santa Fe, NM (US)

(73) Assignee: Knowmtech, LLC, Albuquerque, NM (US)

( * ) Notice: Subject to any disclaimer, the term of this patent is extended or adjusted under 35 U.S.C. 154(b) by 501 days.

(21) Appl. No.: 12/612,677

(22) Filed: Nov. 5, 2009

(65) Prior Publication Data

US 2010/0280982 A1 Nov. 4, 2010

Related U.S. Application Data

(60) Provisional application No. 61/111,392, filed on Nov. 5, 2008, provisional application No. 61/182,086, filed on May 28, 2009.

(51) Int. Cl.
- G06F 15/18 (2006.01)
- G06E 1/00 (2006.01)
- G06E 3/00 (2006.01)
- G06G 7/00 (2006.01)
- G06N 3/02 (2006.01)
- G06N 3/04 (2006.01)

(52) U.S. Cl. .................. 706/25; 706/15; 706/26; 706/27
(58) Field of Classification Search .................. None
See application file for complete search history.

(56) References Cited

U.S. PATENT DOCUMENTS

| | | | | |
|---|---|---|---|---|
| 7,392,230 | B2* | 6/2008 | Nugent | 706/15 |
| 7,409,375 | B2* | 8/2008 | Nugent | 706/26 |
| 7,502,769 | B2* | 3/2009 | Nugent | 706/26 |
| 2007/0192267 | A1* | 8/2007 | Hawkins et al. | 706/52 |
| 2007/0192268 | A1* | 8/2007 | Hawkins et al. | 706/52 |

OTHER PUBLICATIONS

Erhard Bieberich, Recurrent fractal neural networks: a strategy for the exchange of local and global information processing in the brain, Biosystems, vol. 66, Issue 3, Aug.-Sep. 2002, pp. 145-164.*

* cited by examiner

Primary Examiner — Kakali Chaki
Assistant Examiner — Daniel Pellett
(74) Attorney, Agent, or Firm — Kermit D. Lopez; Luis M. Ortiz; Ortiz & Lopez, PLLC

(57) ABSTRACT

An emotional memory control system and method for generating behavior. A sensory encoder provides a condensed encoding of a current circumstance received from an external environment. A memory associated with a regulator recognizes the encoding and activates one or more emotional springs according to a predefined set of instructions. The activated emotional springs can then transmit signals to at least one moment on a fractal moment sheet incorporated with a timeline for each channel in order to form one or more watersheds. An activation magnitude can be calculated for each moment and transmitted to a reaction relay. A synaptic link can then form between the moment and a motor encoder, thereby linking a specific moment with a specific action state.

20 Claims, 17 Drawing Sheets

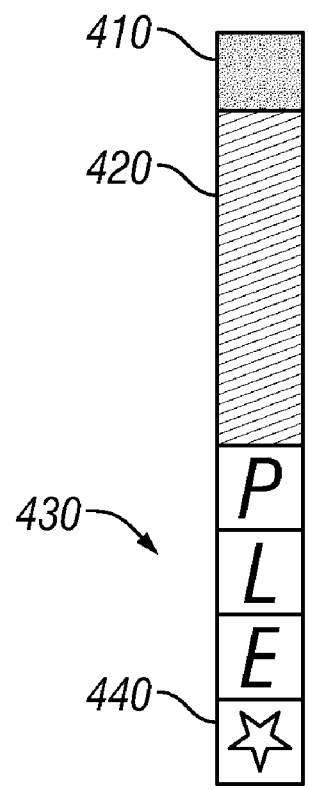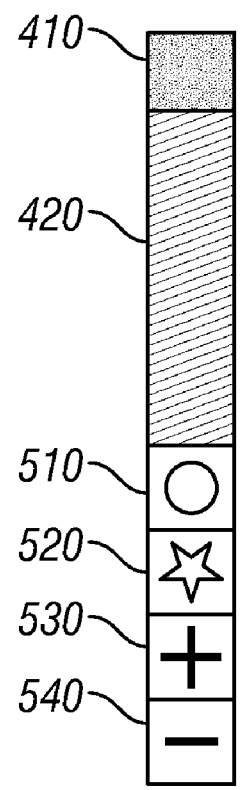
FIG. 4   FIG. 5

WATERSHED MEMORY SYSTEMS AND METHODS

CROSS-REFERENCE TO PROVISIONAL APPLICATION

This patent application claims the benefit under 35 U.S.C. §119(e) of U.S. Provisional Application Ser. No. 61/111,392 entitled: "Emotional Memory Control System and Method for Generating Behaviors," filed on Nov. 5, 2008 and is incorporated herein by reference in its entirety. This patent application also claims the benefit under 35 U.S.C. §119(e) of U.S. Provisional Application Ser. No. 61/182,086, entitled "Watershed Memory Systems and Methods," which was filed on May 28, 2009 and is incorporated herein by reference in its entirety.

TECHNICAL FIELD

Embodiments are generally related to neural learning systems and methods. Embodiments are also related to memory control systems. Embodiments are additionally related to methods for generating behavior.

BACKGROUND OF THE INVENTION

Artificial intelligence generally relates to the study and design of computer systems that exhibit characteristics associated with intelligence, such as, for example, language comprehension, problem solving, pattern recognition, learning, reasoning from incomplete and uncertain information, etc. Artificial intelligence can be achieved by modeling, for example, computer systems with an artificial neural network technology. The full potential of artificial neural networks, however, remains unrealized because of inherent limitations in current implementations.

Neural learning systems can be utilized to process and transfer knowledge more efficiently and effectively, which significantly reduces learning time while improving memory retention. Such artificial neural networks can be useful in applications such as, for example, speech synthesis, diagnostic problems, medicine, business and finance, robotic control, signal processing, computer vision and so forth. Such neural models achieve a human-like performance over more traditional artificial intelligence techniques for some application areas.

Neural networks can be taught by a successive presentation of sets of signals to one or more primary inputs with each signal set derived from a pattern belonging to a class of patterns, all having some common features or characteristics. Each time a set of signals is presented to the primary inputs, a synaptic weight must be adapted for the neural network to learn from the input. Such neural networks must be first trained with learning or training data before they are capable of generalizing. Acquiring such training data is time-consuming and expensive.

Examples of neural and synaptic learning systems are disclosed in the following issued United States patents, which are incorporated herein by reference and indicated respectively by patent numbers and titles:

U.S. Pat. No. 7,426,501 Nanotechnology neural network methods and systems
U.S. Pat. No. 7,420,396 Universal logic gate utilizing nanotechnology
U.S. Pat. No. 7,412,428 Application of hebbian and anti-hebbian learning to nanotechnology-based physical neural networks
U.S. Pat. No. 7,409,375 Plasticity-induced self organizing nanotechnology for the extraction of independent components from a data stream
U.S. Pat. No. 7,398,259 Training of a physical neural network
U.S. Pat. No. 7,392,230 Physical neural network liquid state machine utilizing nanotechnology
U.S. Pat. No. 7,107,252 Pattern recognition utilizing a nanotechnology-based neural network
U.S. Pat. No. 7,039,619 Utilized nanotechnology apparatus using a neutral network, a solution and a connection gap
U.S. Pat. No. 7,028,017 Temporal summation device utilizing nanotechnology
U.S. Pat. No. 6,995,649 Variable resistor apparatus formed utilizing nanotechnology
U.S. Pat. No. 6,889,216 Physical neural network design incorporating nanotechnology Examples of neural and synaptic learning systems are also disclosed in the following United States patent application publications, which are also incorporated herein by reference and indicated respectively by patent numbers and titles:

20080258773 Universal Logic gate utilizing nanotechnology
20070176643 Universal logic gate utilizing nanotechnology
20070022064 Methodology for the configuration and repair of unreliable switching elements
20070005532 Plasticity-induced self organizing nanotechnology for the extraction of independent components from a data stream
20060184466 Fractal memory and computational methods and systems based on nanotechnology
20060036559 Training of a physical neural network
20050256816 Solution-based apparatus of an artificial neural network formed utilizing nanotechnology
20050151615 Variable resistor apparatus formed utilizing nanotechnology
20050149465 Temporal summation device utilizing nanotechnology
20050149464 Pattern recognition utilizing a nanotechnology-based neural network
20050015351 Nanotechnology neural network methods and systems
20040193558 Adaptive neural network utilizing nanotechnology-based components
20040162796 Application of Hebbian and anti-Hebbian learning to nanotechnology-based physical neural networks
20040153426 Physical neural network liquid state machine utilizing nanotechnology
20040039717 High-density synapse chip using nanoparticles
20030236760 Multi-layer training in a physical neural network formed utilizing nanotechnology
20030177450 Physical neural network design incorporating nanotechnology Many prior art neural network systems, other than those disclosed above, find it difficult to effectively make choices in a complex world. Also, such neural network systems are unable to associate prior circumstances and actions with the consequences of actions taken over time. Consequently, such systems are unable to provide mechanism that illustrates how successful behaviors are actively explored and learned. Such neural network systems have yet to be extended with an emotional subsystem for handling much more complex situations.

Based on the foregoing it is believed that a need exists for an improved distributed, fine-grained neural learning system. A need also exists for an improved emotional memory control system for generating successful behaviors, as described in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide for an improved distributed, fine-grained neural learning system.

It is another aspect of the disclosed embodiments to provide for an improved emotional memory control system for generating successful behaviors.

It is a further aspect of the disclosed embodiments to provide for a memory system that enables intelligent control systems as well as human interaction with such control systems.

It is yet another aspect of the disclosed embodiments to provide for a generic computation resources that can be applied to a number of wide-ranging control applications.

The aforementioned aspects and other objectives and advantages can now be achieved as described herein. A watershed memory control system and method for generating behaviors that can be expressed through one or more motor actions is disclosed. A sensory encoder provides a condensed encoding of a current circumstance received from an external environment and/or an internal body. A genetic emotional memory associated with a regulator may recognize the encoding and activates one or more emotional springs according to a predefined set of instructions. The activated emotional springs can then transmit signals to one or more moments on a fractal moment sheet incorporated with a timeline for each emotional channel in order to form one or more watersheds (P, L and E). Thereafter, an activation magnitude, which is a sum of the watersheds, can be calculated for each moment and transmitted to a reaction relay. A synaptic link can then form between the moment and a motor encoder, thereby linking a specific moment with a specific action state.

The emotional memory system generates and switches between learned behaviors that are expressed through the motor actions. The motor encoder associated with an action state can execute the series of motor sequences required for the action state. The emotional memory system "learns" expected responses of actions by recording the circumstance in moments on the fractal moment sheet. A decision to record a moment on the fractal moment sheet can be determined by a moment writer. If a sufficiently large fractal moment sheet is available, the moment writer can simply progress from one moment to the next along a time line without overwriting a pre-existing moment. If a sufficient space is not available, the moment writer can overwrite existing moments.

The emotional memory system can select actions based on the consequences of prior actions taken in similar circumstances. The genetic emotional memory modulates the relative magnitudes of P, L and E levels to various circumstances in order to create a complex system of watersheds. The watersheds act as a filter to evaluate the consequence of prior actions and select actions beneficial to the emotional memory system. A number of factors can be utilized to determine the emotional spring levels and the memory encodes how the sensory information can be linked with the P, L or E response.

In general, a number of circumstances may activate the emotional springs, and the instructions related to the activation of the springs from the patterns of the sensory encoder can be stored in the genetic emotional memory. Such instructions can be embedded in the memory which link present circumstance to activation of the emotional springs that can ultimately determine the behavior drives of the emotional memory system. The emotional memory system selects an appropriate action through the available consequence of related prior actions via the emotional watersheds associated with each moment. The emotional memory system selects the moment based on the similarity to prior moments, and then down selects the potential matches based on the watersheds.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 4 illustrates a perspective view of a moment associated with the emotional watersheds, in accordance with the disclosed embodiments;

FIG. 5 illustrates a perspective view of the moment associated with the pleasure/pain watershed, in accordance with the disclosed embodiments;

DETAILED DESCRIPTION

The particular values and configurations discussed in these non-limiting examples can be varied and are cited merely to illustrate at least one embodiment and are not intended to limit the scope thereof.

Figure 1:
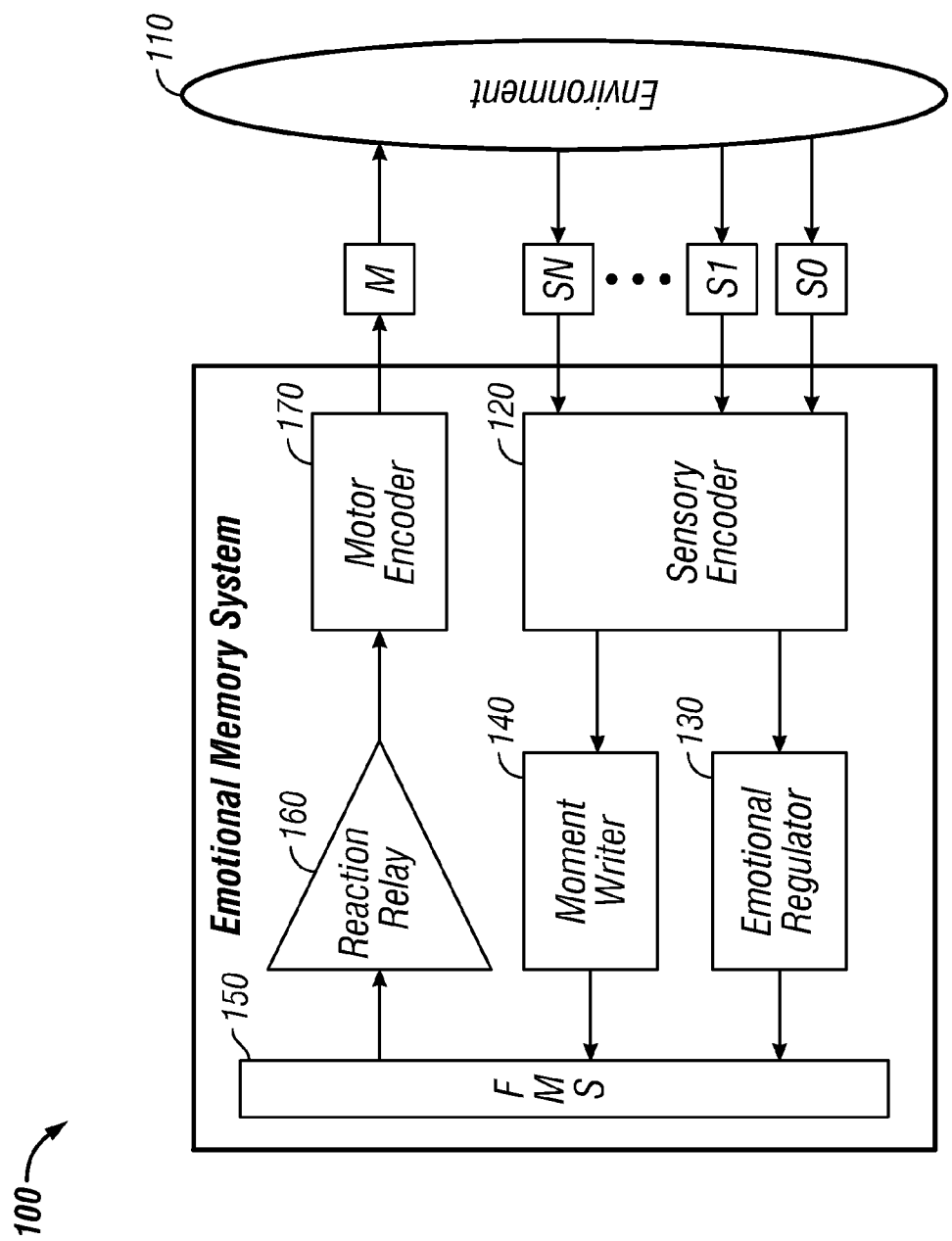
FIG. 1 illustrates a block diagram of emotional memory system interacting with an environment, in accordance with the disclosed embodiments.

FIG. 1 illustrates a block diagram of emotional memory system 100 capable of interacting with an environment 110, in accordance with a preferred embodiment. System 100 can be configured as a learning control system that generates behaviors. System 100 selects actions based on the consequences of prior actions taken in similar circumstances. System 100 includes one or more collection of sensors S0-SN as depicted in FIG. 1. The sensors S0-SN include a collection of transducers that are capable of converting energy in the environment 110 into one or more electrical signals. The sensors S0-SN provide a mechanism for receiving information about the external environment 110 and/or an internal state.

The emotional memory system 100 further includes a sensory encoder 120 that can encode raw information related to the environment 110 into a compact hierarchical representation. Such hierarchical encoding is required for an efficient generalization of patterns when performing a best match on a condensed representation. Various amounts of energy may be required to form such compact hierarchical representation. For example, a number of pressure sensors arrayed over a surface of a naturally hierarchical body plan can be easily converted into a hierarchical format, whereas pixelated visual information requires substantially more energy.

The hierarchical representation generated by the sensory encoder 120 provides a condensed encoding of a current circumstance 610. The encoded information along with an emotional imprint can form a part of the basic computational unit, such as one or more moment(s) 250. Each moment 250 in time can be recorded along a timeline 620 in association with a fractal moment sheet 150. The fractal moment sheet 150 constitutes the sum total of all moment(s) 250 arranged in a serpentine fractal structure and connected locally via the timelines 620. Such a fractal moment sheet 150 can be scaled indefinitely.

The decision of where to record the moment 250 on the fractal moment sheet 150 can be determined by a moment writer 140. If a sufficiently large fractal moment sheet 150 is available, the moment writer 140 can simply progress from one moment 250 to the next along the time line 620 without having to overwrite a pre-existing moment 250. If sufficient space is not available, the moment writer 140 is capable of overwriting existing moments 250. The process of overwriting existing moments 250 can be a multi-step process that requires a mandatory downtime, wherein a number of emotional watersheds 430 related to the existing moments 250 are evaluated while actions are not taken.

The significance of the moment 250 can be determined after recording the consequences of the actions taken. Each moment 250 can be recorded in order to know the consequence at the time of action. As the recorded moments 250 fill the fractal moment sheet 150, the moments that led to a null emotional response are preferentially removed. The addresses of the available moments 250 can be determined and may be optimally rearranged on the fractal moment sheet 150 during the period of down time where actions are not taken. For robots navigating a surface, note that a geographic location encoding generated by the sensory encoder 120 can provide at least one method for writing to the fractal moment sheet 150.

FIG. 1 further illustrates an emotional regulator 130 that includes one or more emotional springs such as P, L and E, and a genetic emotional memory 135. The emotional springs P, L and E can be an ultimate source for emotional signals that generate one or more watersheds 430. Such emotional springs P, L and E transmit the signals to every moment on the fractal moment sheet 150. Moments 250 that preceded a time where significant levels of P, L or E are not attained can be deemed unimportant and can be overwritten. The strength of the connection is set proportional to the magnitude of the emotional levels. The function of the emotional regulator 130 can be to generate and maintain the P, L and E levels associated with the emotional springs.

A number of circumstances 610 may activate the emotional springs P, L and E, and the instructions related to the activation of the springs P, L and E from the patterns of the sensory encoder 120 are stored in the genetic emotional memory 135. Such instructions can be embedded in the genetic emotional memory 135 which link present circumstance 610 to activation of the emotional springs that can ultimately determine the behavior drives of the emotional memory system 100. The genetic emotional memory 135 does not directly produce behavior but rather sets up the conditions for evaluating the importance of a generated behavior. Such conditions can be, for example, acquiring energy is good, falling down is bad, social approval is good, social disapproval is bad, novelty is good, etc. A genetic encoding of the sensory stream can be provided for creating such emotional drive so that the genetic emotional memory 135 can recognize the encoding and produce the appropriate output of P, L or E.

The emotional memory system 100 generates and switches between learned behaviors and such behavior is ultimately expressed through motor actions M. The emotional memory system 100 learns expected emotional responses of actions by recording the circumstance 610 in the moment 250 on the fractal moment sheet 150. An action state can also be recorded along with circumstance 610. The activation signals encoding the moment activation magnitude can be transmitted to a reaction relay (RR) 160. A synaptic link can then be made between the moment 250 and the action, thus linking a specific moment 250 with a specific action state.

The collection of motor output sequences can be controlled by a motor encoder (ME) 170, which provides a high-level interface to foundational movements that together form the modular components of the behavior. The motor encoder 170 associated with the action state can execute the series of motor sequences required for the action state. The motor encoder 170 can also provide the reverse function of combining sequences together to form the action state. That is, the motor encoder 170 simultaneously acts as a top control mechanism to initiate states but also as a bottom-up clustering mechanism for encoding action states.

Figure 2:
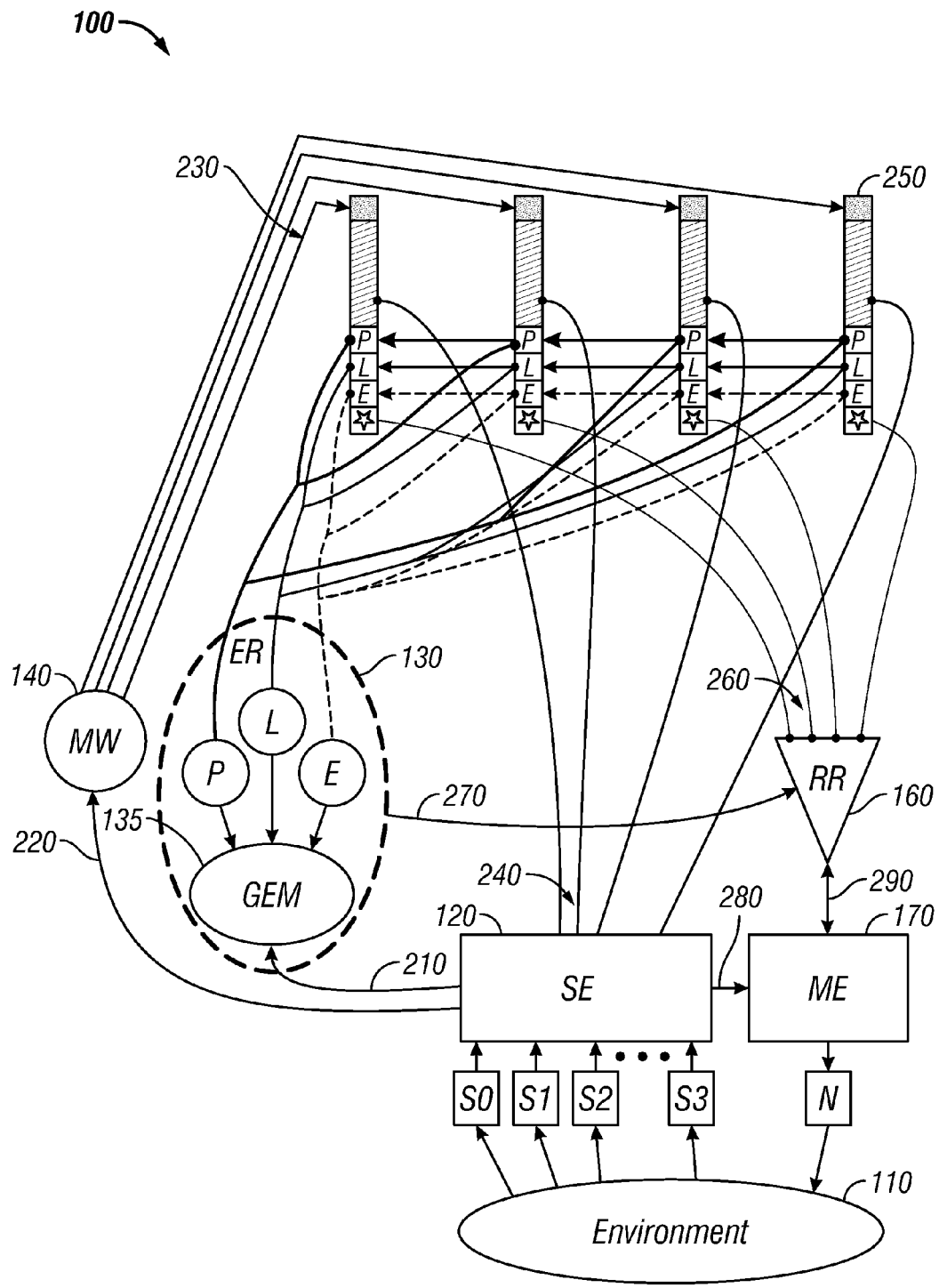
FIG. 2 illustrates a schematic diagram of the emotional memory system associated with emotional watershed channels (P, L and E), in accordance with the disclosed embodiments.

FIG. 2 illustrates a schematic diagram of the emotional memory system 100 associated with emotional watershed channels such as P, L and E, in accordance with a preferred embodiment. Note that in FIGS. 1-7, identical or similar parts are generally indicated by identical reference numerals. The genetic emotional memory 135 modulates the relative magnitudes of the P, L and E levels to various circumstances 610 in order to create a complex system of emotional watersheds 430. The emotional watersheds 430 can act as a filter to evaluate the consequence of prior actions and select only the actions beneficial to the emotional memory system 100.

A modulatory connection 210 from the sensory encoder 120 to the genetic emotional memory 135 provides sensory information to the genetic emotional memory 135 to set the P, L and E levels. Another modulatory connection 220 from the sensory encoder 120 to the moment writer 140 provides information about the current sensory state for use with the moment writer 140 to determine where to write the current moment 250 on the fractal moment sheet 150. One possibility is to use geographical information to write moments 250 to the fractal moment sheet 150. Connections 230 from the moment writer 140 to each moment 250 in the fractal moment sheet 150 can be utilized to control the recording of the current moment 250 on the fractal moment sheet 150.

Connections 240 from the sensory encoder 120 to the fractal moment sheet 150 provide the circumstance 610 to all the moments 250 for both recognition and recording. Similarly, connections 260 from the fractal moment sheet 150 to the reaction relay 160 acts as a connection between the current moment 250 and the current action state. Such connections 260 provide a measure of moment activation. A modulatory connection 270 from the emotional regulator 130 to the reaction relay 160 provides a modulating influence to the reaction relay 160 for the purpose of protecting against hyperactive or hypoactive behavior.

A connection 280 from the sensory encoder 120 to the motor encoder 170 provides the sensory state encoding that specifies the current action state. That is, a condensed hierarchical description of the action state can be provided to the motor encoder 170, which in turn links the encoding with the active motor states. A bi-directional connection 290 links the reaction relay 160 with the motor encoder 170. Such connection 290 can be utilized to project the current action state to the reaction relay 160 in order to inform the reaction relay 160 of the current action state. The reaction relay 160 projects the desired action state to the motor encoder 170.

Figure 3:
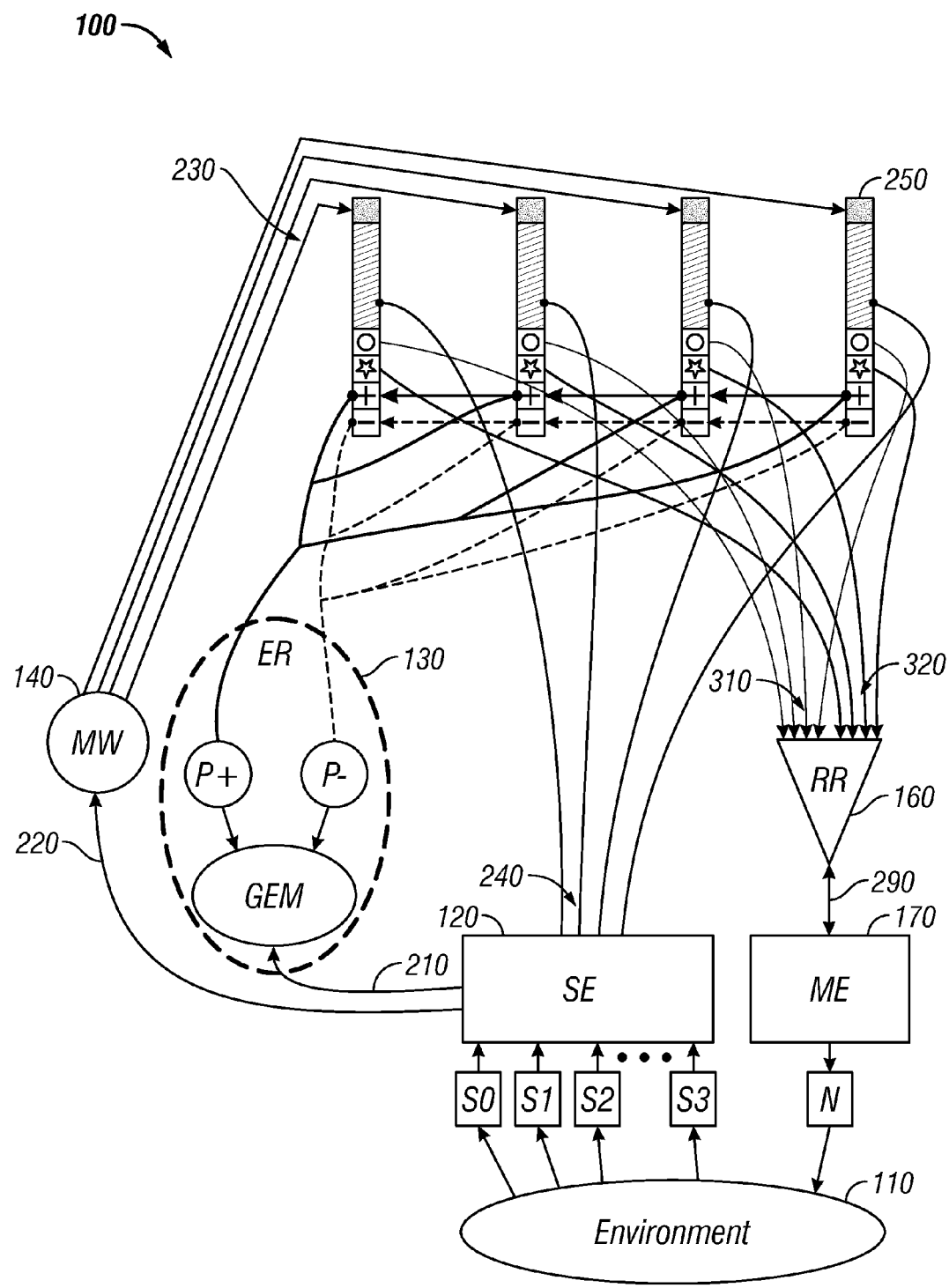
FIG. 3 illustrates a schematic diagram of the emotional memory system associated with a pleasure/pain channel, in accordance with the disclosed embodiments.

Note that, as shown in FIG. 2 and FIG. 3, the bold lines with an arrow end 230 and 280 illustrates non-plastic connections and the lines with dotted end 240 and 260 illustrates plastic connection. Also, the connection 280 illustrates modulatory connections. Modulatory connection transmits one or more module variables, which may be utilized by the receiving module to control its state. P, L and E are general regulatory signals encoding three different reward dimensions. There may be many causes of P, L and E, and each cause can have a signature associated with the circumstance 610.

For example, a limb of the body associated with the emotional memory system 100 is hyper extended; such hyperextension can be encoded in the circumstance 610. A sharp decrease of the P levels may indicate that hyperextension is bad. There may be many circumstances 610 that are undesirable, and actions must be taken to reduce the probability of experiencing those circumstances 610. The emotional memory selects the moment 250 primarily on the similarity to prior moments, and then down selects those potential matches based on the emotional watersheds 430. The emotional memory system 100 may take unique and appropriate actions for various conditions that cause the release of P, L or E. Hence, the system 100 learns to find an exact action that leads to a P, L or E increases for a specific circumstance 610.

FIG. 3 illustrates a schematic diagram of the emotional memory system 100 associated with a pleasure/pain channel, in accordance with a preferred embodiment. Note that as utilized herein the "pleasure/pain channel" can be a reward channel as illustrated in FIG. 2. Note that the embodiments discussed herein should not be construed in any limited sense. It can be appreciated that such embodiments reveal details of the structure of a preferred form necessary for a better understanding of the invention and may be subject to change by skilled persons within the scope of the invention without departing from the concept thereof.

The emotional spring(s) P is the ultimate source for pleasure and pain, and can transmit the signals to at least one moment 350 on the fractal moment sheet 150. A connection can be thus created between the P+ sub module of the emotional spring and the pleasure layer of the current moment 350. A connection can also be formed between the P− sub module of the emotional spring and the pain layer of the current moment 350. The strength of the connection is set proportional to the magnitude of the current pleasure and pain levels. The function of the emotional regulator 130 can be to generate and maintain the P+ and P− levels.

A number of factors can be utilized to determine the P+ and P− levels, and the genetic emotional memory 135 encodes how sensory information may be linked with either a pleasure or pain response. For example, hyper-extended movements that risk harm to the body may activate the P− level to various degrees, while the acquisition of energy may activate the P+ spring. The information encoded in the circumstance 610 to invoke a reward response must be a state that the sensory encoder 120 is guaranteed to converge to. If the sensory encoder 120 did not converge to a known output encoding it would be impossible to "program" the genetic emotional memory 135 to assign emotional significance to external events and thus guide the behavior of the emotional memory system 100. For example, if a designer needs to encourage group behavior, the L springs may be activated by the presence and or actions of other emotional memory systems within the environment 110. However, for this to occur, the sensory encoder 120 must converge to a known state that indicates the presence of another group member. Such an approach may be as simple as the recognition of a smile or a frown, or as complex as the recognition of a face.

FIG. 4 illustrates a perspective view of the moment 250 associated with the emotional watersheds 430, in accordance with a preferred embodiment. The moment 250 can be composed of several functional layers, which may be combining with each other so long as the core functionality can be achieved. The moment 250 includes a write enable 410, a sensory 420, the emotional watersheds 430 and an activity 440. The sensory 420, which receive input from the sensory encoder 120, comprise a condensed hierarchical representation of all sensory data streams and records varying circumstances 610. The write enable 410 receives input from the moment writer 140 signals and the activation of the moment 250 induces plasticity and records the current circumstance 610 and the emotional imprint. The emotional watersheds 430 include P watershed, L watershed and an E watershed. The P watershed maintains a connection to the pleasure and pain spring, the L watershed facilitates long-term goal-directed behavior, and the E watershed facilitates behaviors that lead to or away from novelty. The activity 440 signals the activation magnitude of the moment 250, which is the sum of the emotional watersheds 430.

FIG. 5 illustrates a perspective view of the moment 530 associated with a pleasure and pain watershed 530 and 540, in accordance with a preferred embodiment. The pleasure watershed 530 maintains a connection to the pleasure spring P+, the strength of which is proportional to the pleasure level when the moment 350 is recorded. The pain watershed 540 maintains a connection to the pain spring P−, the strength of which is proportional to the pain level when the moment 350 is recorded. The pleasure watershed 530 and the pain watershed 540 can be formed by propagating the pleasure and pain level down-timeline through the connection. A pleasure output 520 can be projected to the reaction relay 160 utilizing a connection 310. The timing and rate of such pain output signal 520 can be the expected pleasure that will result as a consequence of the action taken when the moment 350 is recorded. A pain output 510 can be projected to the reaction relay 160 utilizing connection 320. The timing and rate of such pain output signal 510 can be the expected pain that will result as a consequence of the action taken when the moment 350 was recorded.

Figure 6:
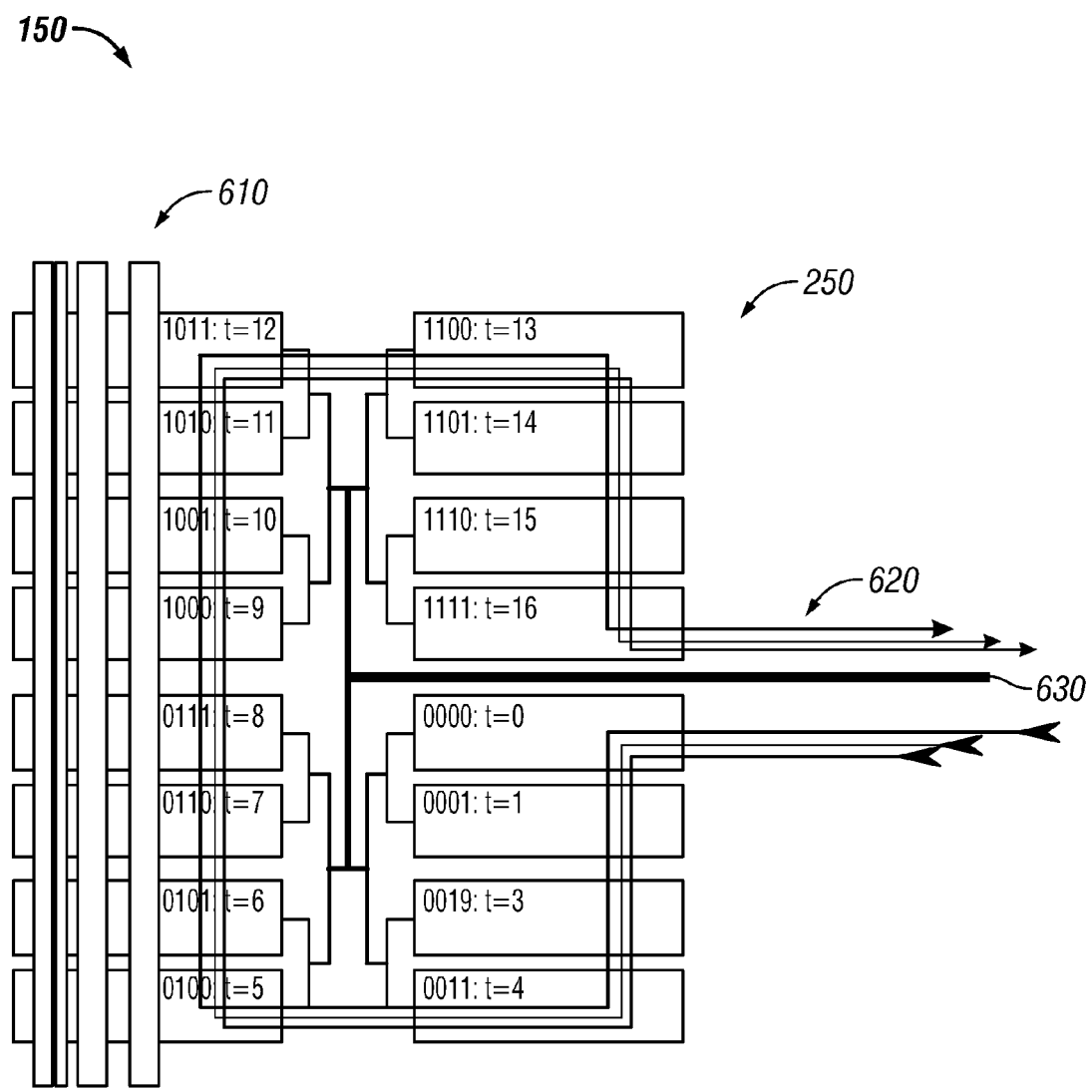
FIG. 6 illustrates a perspective view of a fractal moment sheet associated with the emotional watershed channels, in accordance with the disclosed embodiments.
Figure 7:
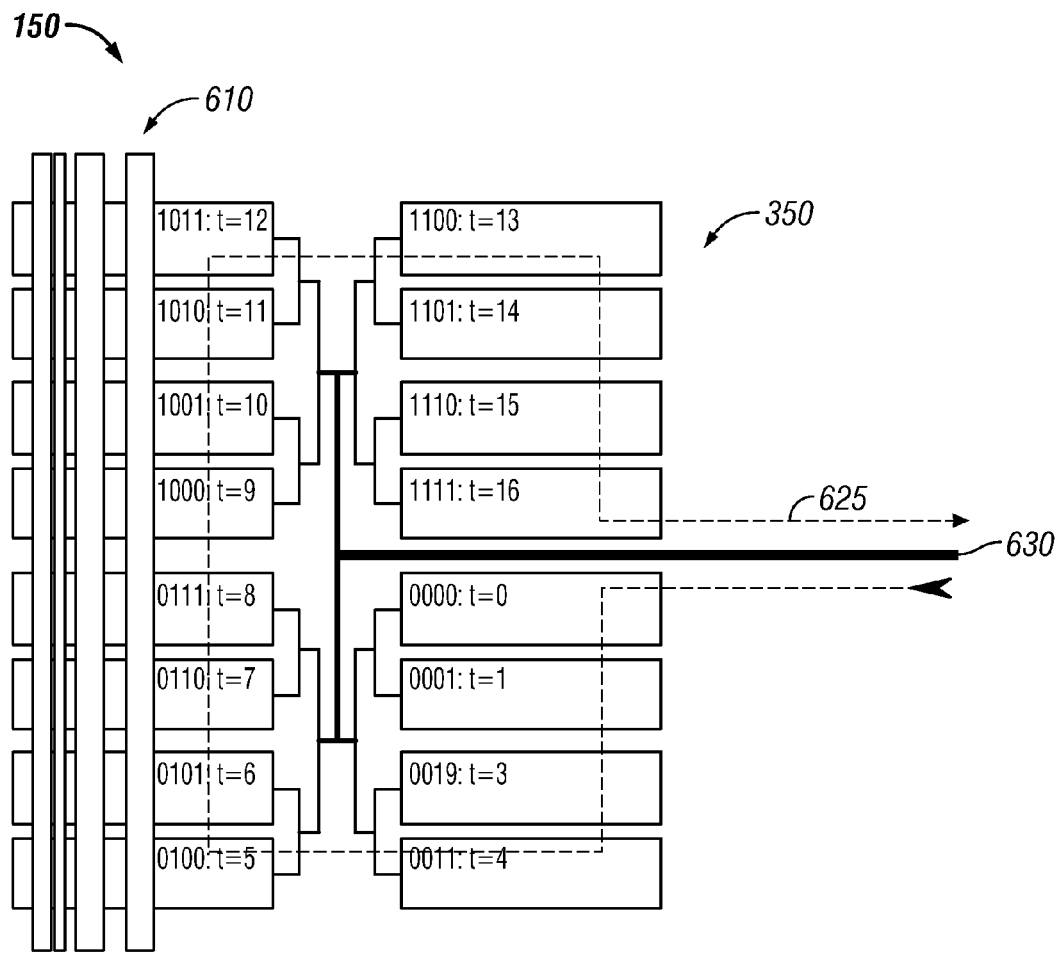
FIG. 7 illustrates a perspective view of the fractal moment sheet associated with the pleasure/pain channel, in accordance with the disclosed embodiments.

FIG. 6 illustrates a perspective view of the fractal moment sheet 150 associated with the emotional watersheds 430, in accordance with a preferred embodiment. Again as a remainder, note that in FIGS. 1-7, identical or similar parts are generally indicated by identical reference numerals. The fractal moment sheet 150 is the sum total of all moments 250, arranged in a fractal branching structure and connected locally via the timelines 620. The timelines 620 can be associated with various emotional channels. The timeline 625 can be associated with the pleasure/pain channel P+ and P− as depicted in FIG. 7. The fractal moment sheet 150 can be incorporated with the fractal memory 630. The moments 250 can be written to the fractal moment sheet 150 along the timelines 620. The timeline 620 is a series of non-plastic local connections that allows the propagation of the emotional tracers down-timeline. The addition of each moment 250 provides a combination of information related to the current reward state (the P, L and E levels), the regularities in the environment 110 and its body, as well as the action state of the body provided by the ME 170.

The current reward state bears no significance to the current action and sensory state and the information can be stored together as it occurs together in time. An action that leads to pleasure is an action worth taking in the future and an action that leads to pain is an action worth avoiding. The watershed layers 430 of each moment can propagate the reward significance of the succeeding moments 250 backwards along with the timelines 620, from the present moment to the past moment. Such an approach is analogous to a mountain spring, where each moment 250 may be a potential source of a reward fluid (P, L and E), which then flows downhill (down-timeline).

The watershed of the moment 250 is the sum total of all the upstream P, L and E, minus a decay or leakage. If the moment watersheds 430 are reward rich (high P, L or E levels) then the actions that are taken around the time that moment 250 was recorded are advantageous and can be repeated or attempted in similar circumstances 610 in the future. Similarly, if the moment watersheds 430 are reward poor then the actions taken at the time the moment 250 is recorded are disadvantageous and should not be taken again. If high levels precede low levels, it is possible that the abundant upstream levels may counteract the lower downstream levels so as to encourage the actions taken, even though they lead to short term shortage.

Hence each moment 250 becomes bathed in a "watershed" of P, L or E signals that accumulate via upstream spring sources, which follow from the consequences of the actions taken after the moment 250. The reward signals are sourced by the reward spring and such channels may be later modulated to down-select moments 250 based on various relative degrees of P, L or E. The emotional memory system 100 chooses an appropriate action through the available consequence of all prior actions via the emotional watersheds 430 of each moment 250. The watersheds 430 can be treated as a constant background "field potential" of reward significance that attempts to rate the importance of actions taken to the results acquired.

For example, life of an intelligent agent can be considered as a multitude of bifurcations, where each bifurcation represents a choice of what action to take. The actions can be taken at each bifurcation, and the paths of each choice cab be plotted over time. In such a case, the result look likes a vast tree, or a perhaps more accurately to the present invention, vast river tributary system stretching forever into the mountains. Also, consider that all actions leading to pleasure (high P, L or E) or pain (low P, L or E) are propagated downstream and occur in various magnitudes. The tributary (action) with the highest concentration of P, L or E can be taken. The fractal moment sheet provides a mechanism for turning the single timeline 620 into a vast tree of possibilities, providing the ability to gauge the consequences of each possible action and choosing the one that leads to high levels of P, L or E. Such a watershed approach enables the system project far into the future, far exceeding the time scale that moments 250 are recorded.

The electronic structure need to implement the emotional memory concept can be attained with a slight but important modification to the fractal memory 630 to enable a timeline 620 for each emotional channel. If the node of the fractal memory 630 is a binary address, then the timeline 620 can be formed simply by counting in binary and "connecting the dots" with the object nodes, which can be utilized to encode moments 250. The address can be simply encoded by a traditional binary clock that ticks off time, one moment 250 at a time. As time increases, new moments 250 can be recorded along the timeline 620. The resulting serpentine timeline 620 is fractal, and as a consequence can be scaled indefinitely.

Figure 8:
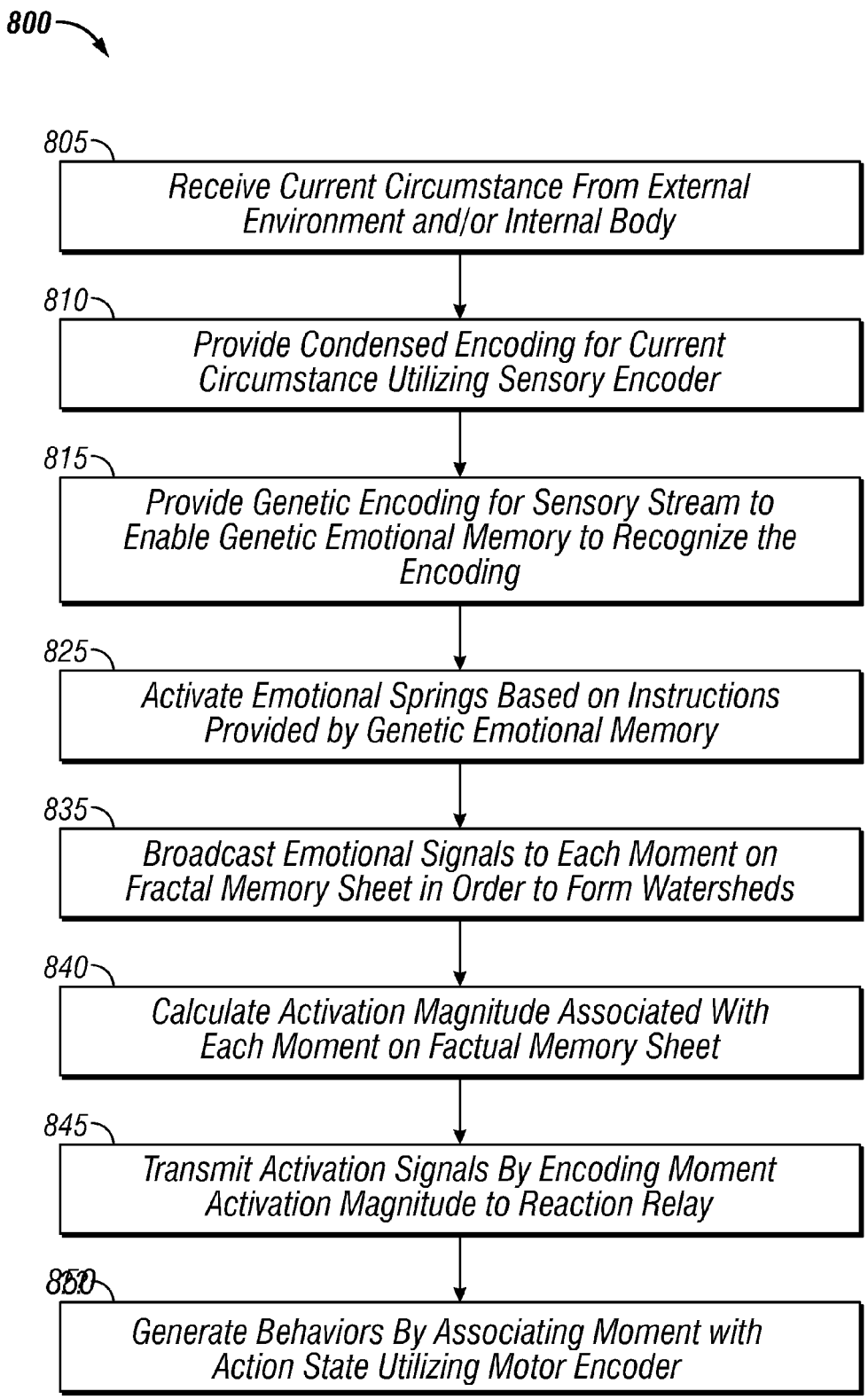
FIG. 8 illustrates a high level flow chart of operations illustrating logical operational steps of a method for generating behaviors, which can be implemented in accordance with the disclosed embodiments.

FIG. 8 illustrates a high level flow chart of operations illustrating logical operational steps of a method 800 for generating behaviors, in accordance with a preferred embodiment. The current circumstance 610 can be received from external environment 110 and/or internal body, as depicted at block 805. Thereafter, condensed encoding can be provided for the current circumstance 610 utilizing the sensory encoder 120, as illustrated at block 810. Thereafter, as shown at block 815, genetic encoding can be provided for the sensory stream to enable genetic emotional memory 135 to recognize the encoding and to produce the appropriate output of P, L or E.

The emotional springs can then be activated according to the instructions provided by the genetic emotional memory 135, as shown at block 825. Thereafter, the emotional signals can be transmitted to each moment on the fractal memory sheet 150 in order to form watersheds 430, as illustrated at block 835. The activation magnitude associated with each moment 250 on the fractal memory sheet 150 can be calculated, as depicted at block 840. Thereafter, activation signals by encoding moment activation magnitude can be transmitted to the reaction relay 160, as illustrated at block 845. The behaviors can be generated by associating the moment 250 with the action state utilizing the motor encoder, as depicted at block 850. The motor encoder 170 provided with an action state can execute the series of motor sequences required for the action state. The emotional memory control system 100 actively explores and learns successful behaviors for dealing complex situations where effective choice making is a predominant factor.

A Watershed Memory (WM) is a simple yet powerful memory system that could enable more intelligent control systems as well as human interaction with those control systems. The aim of WM is that of a generic computational resource that can be applied to a number of wide-ranging control applications and scaled indefinitely. Although WM is a generic computation resource, it is best thought of as a control system. In this context, we may speak of a larger context of an environment that can be influenced by actions of the WM system. Stated another way, WM can be "embodied" within an environment and allowed to act on its environment. WM's primary resource is a structure that allows it to link cause and effect, where the cause is the current sensory/motor state and the effect is the future reward state. The goal of WM is to find those actions that, when taken during the appropriate context, will result in the maximal future reward. To clarify terminology we will refer to the action or movement that is performed on the environment as a flex. This may be interpreted literally as the flex of a muscle, or abstractly as the activation of any control structure.

Flexes arise from the activation of a motor resource, or simply a "motor". A flex may be the result of hardwired circuits simply reacting to a stimulus. We will refer to this condition as a reflex. A flex may also result from the prediction of future reward, which we will refer to as a preflex. Preflexes arise solely from prior experience, can be modified continuously, and are solely responsible for generating directed behavior. Reflexes on the other hand are unchanging, incapable of modification, and available at birth or initialization.

One use of WM is as a control system that can convert reflexes into preflexes. It accomplishes this task by storing a vast number of encoded memories, linking memories with future reward states and selecting future flexes based on expected circumstantial reward. This is a very challenging task for a number of reasons. First, a vast number of memories must be stored. Second, the every-growing database of memories must be searchable in a meaningful manner that allows for the appropriate extraction of context on a number of categorical levels to aid in association. Third, memories must be searchable based on the future consequence of flexes, wherein the consequence of a flex may only occur on a time scale much longer then the timescale of flexes (In other words, flexes may be taken each second, but the consequence of the flexes may take hundreds or thousands of a seconds to occur. Which of the thousands of flexes taken lead to the reward?) Fourth, a flex may result in a small short-term loss but a large long-term gain. Fifth, it may not be an isolated flex, but the spatial and temporal pattern of flexes that generates the reward.

The aforementioned first and second challenges can be met if it is assumed that all sensory information is suitably encoded. First, the encoding must be highly efficient to allow for high storage density. Second, it must allow categorical retrieval. For example, was it the specific red berry that made me sick, or red berries in general? To learn a rule such as "red berries make me sick" requires that a classification of "red berries" has been made and is searchable. On the other hand, in a complex and realistic environment specific exceptions must be made. To learn a rule such as "red berries make me sick, except for raspberries" requires that all berries share the same "berry" classification while at the same time remaining individually distinct and searchable so that "raspberry" (or any other berry) can be distinguished.

Hierarchical encoding (memory encoding) satisfies the constraints of maximal efficiency and categorical search. A hierarchical encoding can be seen as the address of a leaf on a tree as one works their way up the tree from the trunk. Each bifurcation of the branches is a point of further refinement in classification and represents a level of categorization. The more categories are shared by two encodings, the more similar they are. Hierarchical encodings are ubiquitous in daily human life for exactly these reasons. Our number system is such an encoding. The numbers "513467" and "513422" are both maximally efficient (given a base set of 10 symbols) and can also be compared against each other to determine how similar they are. We could assign them a similarity index of 4 because the first four numbers agree, or, because we have a deeper understanding of what the symbols mean in relation to each other, we can construct some other similarity function $S=f(x1, x2)$. Note that construction of a similarity index that captures a general→specific measure is not possible with an arbitrary or random encoding, nor is it possible via the standard "dot-product" operation assumed by most neural models. Rather, a mechanism must be available to detect sequential matches.

Hierarchical encoding is efficient because the significance of a symbol is completely dependent on its relation to other symbols. The numbers "57953" and "23453" bear little relation each other, even though they both contain the symbols 5 and 3, because they each have a different context. In other words, a hierarchical encoding is actually a sequence, where the "answer" to the "question" determines the next question like a game of twenty-questions. The very structure of the hierarchy, and thus the "questions" asked of the data, is responsible for both its efficiency and also its usefulness in computing a similarity index. Stated another way, the highly efficient encoding is a result of a much larger database of "questions" so that the efficient encoding is made at the expense of a large "encoder".

Figure 9:
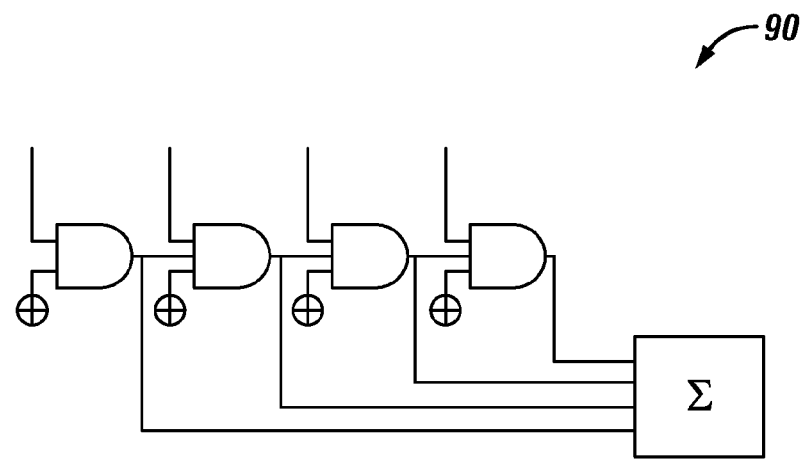
FIG. 9 illustrates a schematic diagram depicting a similarity measure between a stored pattern and an input pattern.

FIG. 9 illustrates a schematic diagram depicting a similarity measure between a stored pattern and an input pattern in the context of a system 90. Note that in the illustration of FIG. 9, as a result of the sequential nature of a memory encoding, a simple dot-product is not sufficient. In this example, the similarity index is computed based on the number of sequential matching bits or categories.

Figure 10:
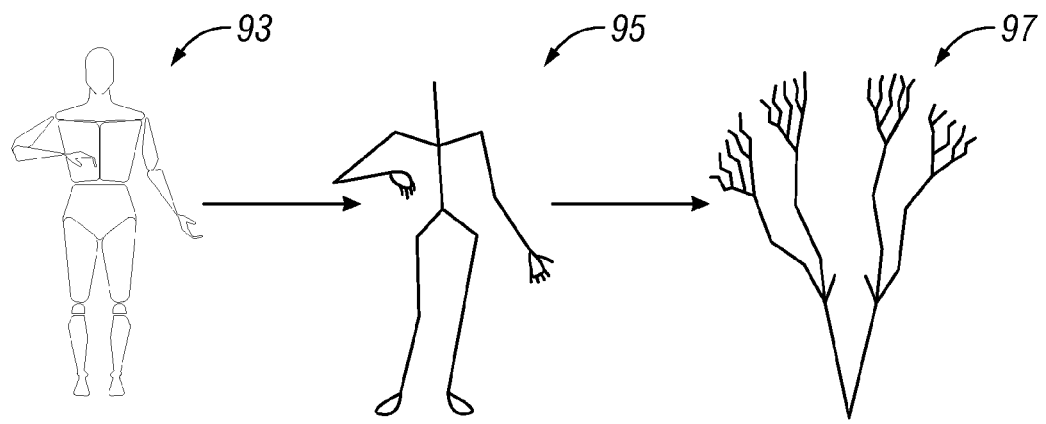
FIG. 10 illustrates a pictorial diagram of memory encoding mapped to a human body.

Generating a hierarchical sensory encoding may be very simple or very difficult depending on the data source. For example, consider a hierarchical encoding of body pain as depicted in FIG. 10. FIG. 10 illustrates a pictorial diagram of memory encoding mapped to a human body as indicated by scenes 93, 95 and 97. As indicated in FIG. 10, taking the human body as an example and starting from the waist, body structure can be seen as a series of bifurcations no different than the branches of a tree. An active pain receptor in the tip of a finger, for example, could be interpreted as "my finger tip hurts" or "my finger hurts" or "my hand hurts" or "my arm hurts" or "my right side hurts" or "my top half hurts" or "my body hurts". In this example a hierarchy is simply imposed on the sensory surface to create the memory encoding.

Visual data, on the other hand, does not originate in a hierarchical form and must be processed to extract a hierarchy, of which many are possible. A great deal of work has been directed toward the task of visual object recognition and the core feature of most of these systems is hierarchical representations. It is largely believed that the primary sensory cortex is forming some sort of hierarchical representation of sensory stimulus so that, for example, edges become corners, corners become objects, etc. It is widely believed that sensory cortex is forming hierarchical representations via unsupervised clustering of sequences. Of course this fits well with a memory encoding scheme, since memory encoding can only be interpreted as a sequence.

Two general methods exist for generating a hierarchical encoding, agglomerative ("bottom-up") or divisive ("top-down"). Although most work related to hierarchical encoding in cortex has focused on agglomerative processes (edges to corners to shapes etc), this method presents problems when learning is considered. Assume, for example, that you are tasked with observing a population of prairie dogs and that you have no previous experience with that specific population. First you must simply recognize the prairie dog from all other animals. You will have previously learned what a prairie dog looks like based on generic illustrations or exposure to specific images, so that upon arrival you will have no trouble recognizing a prairie dog from other animals. Only over time will you start to be able to recognize the members of the group based on their distinctive features. This means that the process whereby your brain has learned to distinguish individual prairie dogs, while retaining the categorization "prairie dog", is divisive and not agglomerative. That is, the original recognition of "prairie dog" remains unaffected but newer subcategories are appended to the classification. This allows for the constant enlargement of the categorization tree while retaining all previously-learned (more general) associations. Stated another way, the system that generates the memory encoding must learn the most significant bits first.

All actionable information must be provided in the memory encoding. The final encoding will likely include a set of smaller, independent memory encodings extracting information such as object identities and categories, properties (color), location (distance), and movement. All regularities within the sensory space that must be acted upon must be available from the memory encoding and searchable via a similarity match. Objects that share similar spatial and temporal patterns should belong to the same category within the memory encoding. Many algorithms have been developed, and continue to be developed, that may accomplish this task. In conclusion, the first step to realizing WM is to provide a system capable of generating a hierarchical encoding via a top-down, divisive process. In general it is not necessary to provide only one encoding. Rather a collection of encodings can be used, each for a specific modality or sense.

The issue of encoding aside, there is the problem of linking cause and effect. It is rarely the case in a complex environment that the consequence of a flex is immediately evident after the flex has occurred. Furthermore, beneficial actions may result in short-term discomfort but long-term reward. It is therefore not nearly sufficient to measure reward from one time-step to the next but rather over timescales much longer than the characteristic timescale of flexes. WM contains a structure, which can be referred to as the Reward Watershed ("watershed") that enables such a long-duration linking of cause and effect.

The watershed is fundamentally a simple structure requiring only local interconnections between nodes. The structural design of WM arises out of a few simple but important observations. First, a brain is faced with a never-ending task of choosing what movements to make. That is, a brains sole function is to move a body to attain energy and reproduce. All other properties that emerge such as emotion, thought, consciousness, etc, are simply by-products of an evolutionary search to solve the movement problem. In no uncertain terms, a brain is a control system. To control something is to choose among action options. This requires the formation of a set of options which it must be constructed from one continuous and temporally linear set of memories. Stated another way, a life may be seen as a traversal up a tree. Each choice of flex takes one up a particular branch of the tree. Each flex will lead to other flexes, each branching out into a multitude of paths. A life can thus be represented as one path up a tree to one distinct leaf. So whereas many paths could have been taken, in the end only one path was taken. The "could have done" must be extracted exclusively from the "did do". That is, before a brain can choose it must first construct its options. A linear series of memories (the path) is thus converted into a possibility tree (future choices).

Figure 11:
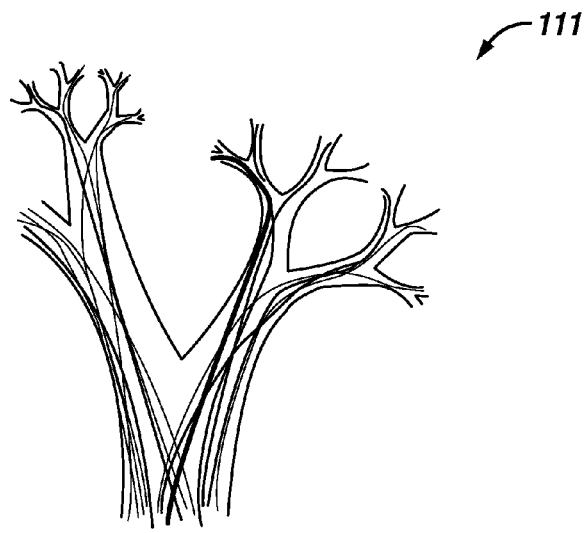
FIG. 11 illustrates a diagram depicting of a "river of possibility"

The brain must traverse its memory of time in its construction of a possibility tree. The significance of a flex can only be ascertained after the flex has occurred. This requires that a memory of the flex be paired with the future consequence of that flex, disentangling it from the consequences of other flexes. Pairing cause (flex) and effect (reward) over time requires either propagating cause forward in time or effect backward in time. WM arises from the observation that a river tributary system (watershed) provides a powerful model that combines the concepts of a possibility tree with a back-propagation of reward. FIG. 11 illustrates a diagram depicting of a "river of possibility" metaphor 111, in accordance with the disclosed embodiments. FIG. 11 indicates the fact that at any point in time, the optimal reward choice is the one with the highest "reward flow". In the illustration depicted in FIG. 11, various paths represent a source of punishment or a source of reward. The action (or path) to take is the one that will lead to maximal reward.

Suppose, for example, that we walk upstream along a river as indicated in FIG. 11. Further suppose that our path up this river was a metaphor for our path up the possibility tree. The rivers branching into tributaries represents our future choices of flexes. For example, flex "A" would take us up the east fork and flex "B" would take us up the west fork. Further suppose that the water in the river is composed of two liquids, one resulting from the generation of reward and another from the generation of punishment. These "reward sources" represent a time in the (projected) future where reward (or punishment) occurs. As we walk up-stream (forward in time) and the river forks into its tributaries we will always know which branch of the river to travel by measuring the concentration of reward and punishment in each branch and taking the one with more reward (or less punishment).

Just as a river branches into many tributaries, and each tributary branches further, our choices of flex result in more choices of flexes, each with their potential rewards or punishments. The source of reward may be far away in time, the result of many flexes. However, to determine what choice to take at each moment, which is the only choice that matters, we must simply "sample the water" to determine what path leads us to the greatest concentration of reward.

Constructing a WM requires that a vast database of "matchable" memories be stored adjacent to each other along a timeline and that reward is encoded as a flow backwards along the timeline. Imagine that alongside the memories are channels carrying "reward" and "punishment" flows. Each memory may or may not be a source for reward or punishment. When a memory is written to the timeline, the current value of reward (or punishment) is also stored. Rather than a static pattern of bits, however, the reward acts as a source of reward flow, or current, that flows down-timeline. Thus, the concentration of reward in the channels at each memory is the result of the flexes taken (or not taken) at or after the encoding of the memory. It is now readily apparent how the future consequences can be paired with memories: When a reward or punishment is available it is back-propagated down the watershed via a flow.

Figure 12:
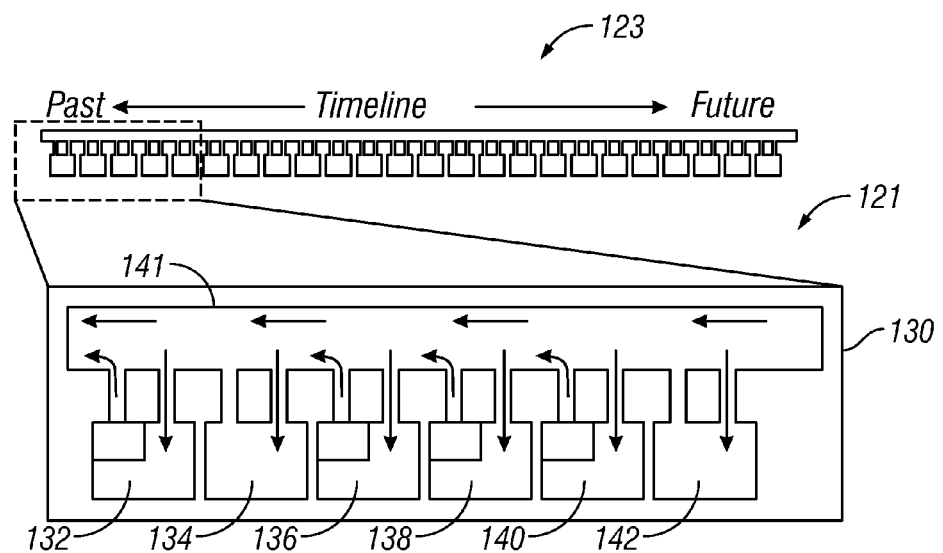
FIG. 12 illustrates a schematic diagram depicting a reward watershed system, in accordance with the disclosed embodiments.

FIG. 12 illustrates a schematic diagram depicting a reward watershed system 121, in accordance with the disclosed embodiments. The system 121 of FIG. 12 is based on the fact that memories can be written along a timeline 123. Memories of reward or punishment are stored as a flow that contributes to the watershed, which flows down-timeline. Thus, each memory has available to it via the watershed, the future reward state. System 121 includes a reward watershed 141 in association with one or memories 132, 134, 136, 138, 140 and 142 in the context of a WM 130.

The "reward flow" can be used to bias a best-match search over all memories. The output of this search will be the memory that satisfies the dual constraint of both contextual matching and reward maximization. The relative degree (ratio) to which a memory is recalled based on contextual match or reward optimization should be controllable. If the context/reward ratio is high then the memories recalled will be those memories with the highest contextual similarity, but the actions taken will not seek to maximize reward. If the context/reward ratio is low then the total memories recalled will be very low and the actions taken will be those that resulted in reward irrespective of the context. Although the connection to emotion will be made later, we may intuitively understand this as the case of the idiot savant who has a remarkable memory yet is unable to take care of himself, or the highly emotional (but often creative) individual whose actions seem totally out of context and often selfish. A balance must therefore be struck so that actions taken are both contextually relevant but also seek to maximize reward.

If we ignore for the moment how a reward is calculated and stored, there is the problem of performing a search over all memories. Let us assume that at t=0, all memories have zero activation. The total activation current A of each memory can be written as follows:

$$A = \mu C + (1-\mu)R$$

$$0 \leq \mu \leq 1, 0 \leq C \leq 1, 0 \leq R \leq 1$$

Where C is the contextual match current, R is the reward match current and μ is a parameter controlling the relative contribution of context to reward in the overall activation. We speak of reward current because each memory must integrate the current over time and generate a pulse when it reaches a threshold. The reason for this will be explained shortly. Let us refine the reward activation into three independent channels representing Novel, Maintenance and Drive components:

$$R = k_N R_N + k_M R_M + k_D R_D$$

$$k_N + k_M + k_D = 1$$

Each reward channel records one dimension of the total reward. There should preferably be at least two reward channels for non-embodied systems and at least three reward channels for an embodied system, however the total number of reward channels can be chosen by the designer. Examples of possible reward channels are:

Novelty—A reward signal that is present when the sensory encoding is novel, that is, not contained in its memory database. This is needed for the system to generate behavior that explores its control space. Compare this to the "E" reward channel discussed earlier.

Maintenance (for embodied systems)—A reward signal that indicates the current body state. This channel is used to direct behavior to deal with self-maintenance, for example acquiring energy and avoiding pain. Compare this to the "P" reward channel discussed earlier.

Drive—A reward signal indicating the presence of a goal-state. This channel is used to dynamically set goals or drives of the control system. Compare this to the "L" reward channel discussed earlier.

In other words, the total reward is given by the sum of the desires to "Explore", "Be Safe", and "Do Work".

Each reward channel is a weighted sum of the local reward flow and the upstream (up-timeline) flow of that channel. Stated another way, the reward along a specific channel (E, P or L) decays down-timeline in the absence of reward, thereby forming a reward trace.

Figure 13:
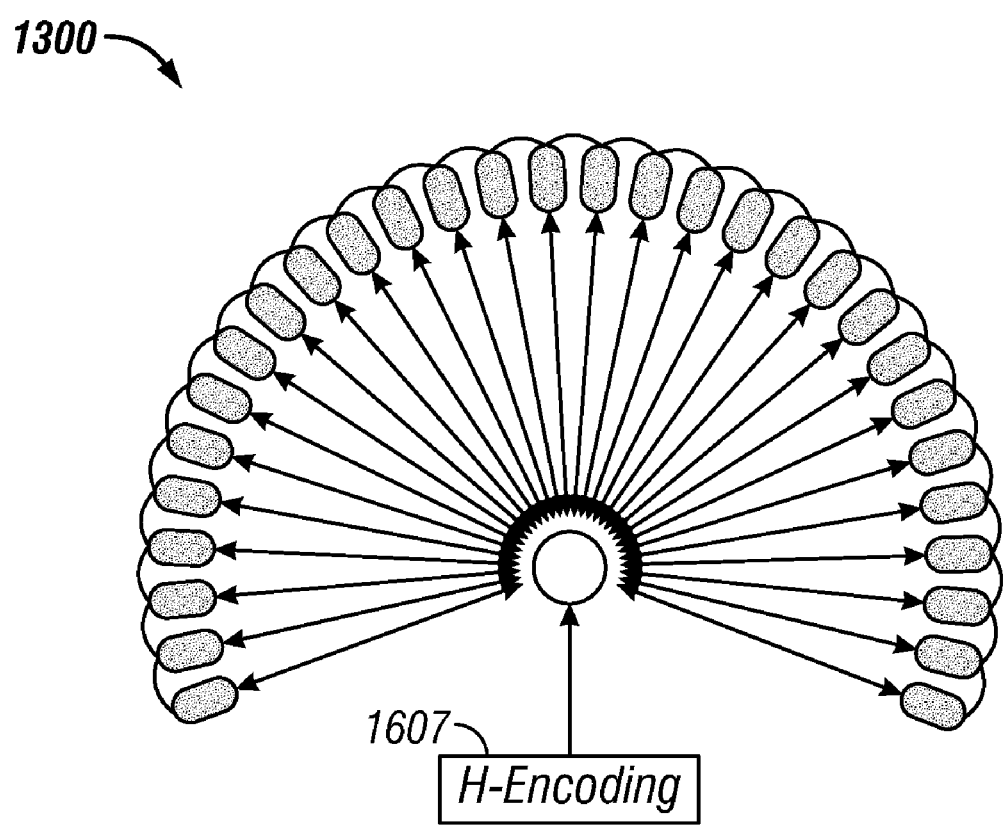
FIG. 13 illustrates a schematic diagram depicting memories stored at nodes a constant distance from a reading location, in accordance with the disclosed embodiments.

FIG. 13 illustrates a schematic diagram of a system 1300 in which memories stored at nodes a constant distance from a reading location, in accordance with the disclosed embodiments. As depicted in FIG. 13, all nodes are activated at the same time and the activation results in a capacitive charging rate proportional to the activation. A pulse is generated when the capacitor reaches a threshold. Then, the pulse delay now encodes the total activation. Pulses that arrive first are the most active. Note that the system 1300 additionally includes an H-Encoding component 1607.

The configuration depicted in FIG. 13, indicates that each movement requires that the WM search over its ever-growing database of memories and extract the memory with the highest activation, which is the sum of a contextual and reward component. This search can be implemented in the time domain so that the first match from the memory is the most active, the second response is the second active, and so forth. This may be accomplished easily if the activity of a memory (its flow or current) is directed to the charging of a node.

When a node attains a threshold, a signal encoding the memory's address is broadcast to a reading location. If the distance from all memory locations to the reading location is the same then the first memory to activate is the most active, followed by the second most active, third most active, and so on. Note that slight variations in distance between modules could be compensated for if the synaptic integration time is much larger than the communication transmission time.

Figure 14:
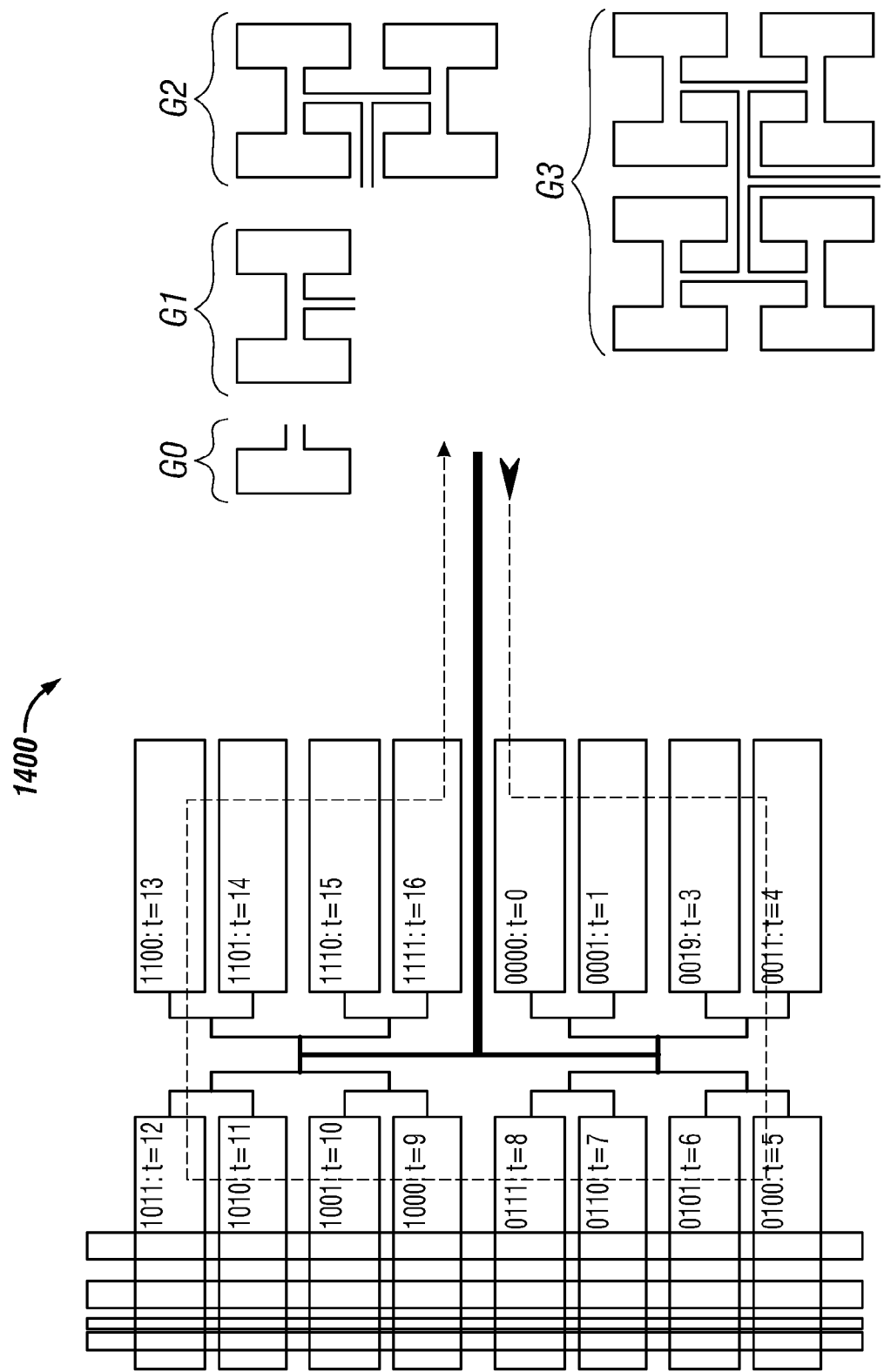
FIG. 14 illustrates a schematic diagram of a fractal memory configuration, in accordance with the disclosed embodiments.

FIG. 14 illustrates a schematic diagram of a fractal memory system 1400, in accordance with the disclosed embodiments. The system 1400 is based on the construction of a scalable memory system, wherein each memory location is the same distance from a common point while locally connecting each memory to its adjacent memory via a fractal tree structure. Note that one example of a fractal memory system and methodology is disclosed in U.S. Patent Application Publication No. 20060184466, entitled "Fractal Memory and Computational Methods and Systems Based on Nanotechnology," by inventor Alex Nugent, which was published on Aug. 17, 2006 and is incorporated herein by reference in its entirety. Note that the patent application upon which the U.S. Patent Application Publication No. 20060184466 was based, issued on Mar. 10, 2009 as U.S. Pat. No. 7,502,769 to Alex Nugent.

As indicated in FIG. 14, a chip structure such as that of system 1400 can be constructed, which allows for a continuous timeline while ensuring that all memories are equidistant from a common output. Its fractal nature allows it to be scaled indefinitely. As an input is broadcast to all memory nodes in a broadcast layer, each node integrates a current and fires a pulse. The most active nodes will fire first, as they will charge faster. As the pulse travels down the routing tree, the address is encoded along an increasing number of bits. The output of the chip is the memory address of the most active node, followed by the address of the second most active, etc.

Note that the communication time should preferably be shorter than the integration (charging) time for this scheme to function reliably. Given that charging can be slowed to milliseconds while communication can take place in nanoseconds, this requirement is easily achieved. Although it will ultimately lead to a sub-optimal system, insuring that charging occurs on a much larger time scale then communication can be used to eliminate the fractal structure altogether. Again, this comes at the cost of scalability and will eventually limit performance.

As previously mentioned, reward is a multi-dimensional vector. Our example includes Novel(exploration), Maintenance(safety) and Drive(work) components. These examples are chosen to rectify a very basic problem: performing work requires exploiting a control space but not exploring. Exploiting a control space can only be accomplished via discovery (exploration). Exploration can lead to harm, and harm must be avoided. That is, work and exploration are orthogonal to each other, as is exploration and safety, yet all three dimensions must be exploited. Stated another way, if a required drive conflicts with another required drive they must be represented as independent reward dimensions. When is the judgment made to stop exploring so as to use the available knowledge to do work? While a specific answer may not be available, a general answer most certainly is: exploring a control space must be maximized early in the life cycle or else no control patterns for doing work could be learned. Exploring must be minimized later in the life cycle or else no work could be accomplished. Thus, the relative importance of Novel to Drive to Maintenance should change over the lifecycle of the WM.

Each reward channel is a driver for certain types of context-dependent behavior. The WM will always attempt to maximize its total reward, the sum over all channels. If the WM is running critically low on energy, a drop in the Maintenance reward should trigger a behavior that stops seeking its drive-goal and starts seeking energy because a greater increase of total reward is possible by seeking energy than by working. When energy has been attained and its Maintenance reward channel level is restored it should continue seeking its drive reward because a greater increase of total reward is attained by doing so. In the absence of both a maintenance and drive reward, it should explore its control space, that is, it should "play around". Playing around is simple "pushing buttons to see what will happen", although it is not random. Since behaviors that repeatedly lead to novelty will be the behaviors most learned, the system will preferably execute behaviors that maximally lead to novelty. As an example, consider a WM system trapped in a room filled with books. After sufficient time the room will be explored and the only behavior that consistently leads to novelty will be reading the books. If all books have been read, they may be stacked into new configurations, and so on. The significant point is that some behaviors will more reliably lead to novelty and, once found, those behaviors will be exploited as a source of novelty precisely because they are reliable.

Circuits must be available to analyze the incoming sensory data for regularities and generate an appropriate reward signal. Given three independent reward channels we must encode three independent rewards with three separate circuits. Joints that have been hyper-extended, exceedingly hot or cold temperatures and physical damage are straight-forward examples. Functionally speaking, reward reflexes represent a mechanism for bounding and guiding the exploration and usage of the control space. To accomplish this, a reward must be remembered, and as discussed above, a reward is stored as a flow. To clarify terminology we will refer to a memory of a reward as a reward flow memory, and a memory of a sensory encoding as simply a memory. The critical reader might say all memories (not just reward) are eventually read-out as a flow, since the "first to fire" method requires a charging of a capacitor, and thus, activation current. This is true, but the key difference is that a reward flow memory must be available prior to the activation of a memory, otherwise it could not bias it. In essence, the sum total of the reward flow memories act to form a "reward field potential", that is set up prior to memory access. Storing a reward as a flow represents a small challenge since it requires a gated-plasticity mechanism. Stated more clearly, each reward flow memory can be thought of as a connection linking the reward watershed with an ultimate "source" of reward, the so-called Reward Springs.

Figure 15:
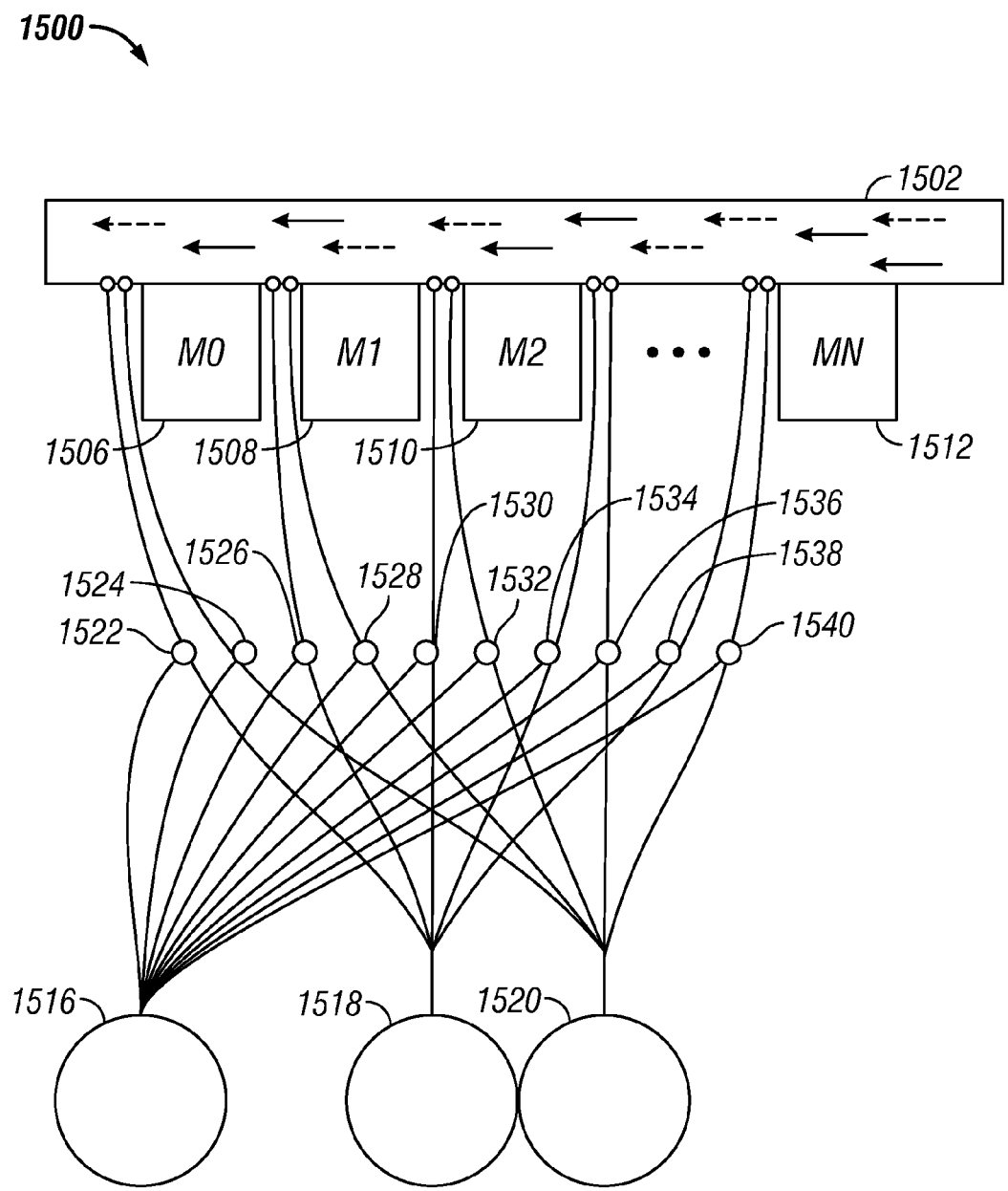
FIG. 15 illustrates a schematic diagram of a configuration of reward flow memories stored as a connection to an ultimate reward source, in accordance with the disclosed embodiments.

FIG. 15 illustrates a schematic diagram of a system 1500 that includes one or more reward flow memories stored as a connection to an ultimate reward source, in accordance with the disclosed embodiments. As indicated in FIG. 15, a reward watershed 1502 is depicted with respect to one or more memories 1506, 1508, 1510, 1512 (i.e., respectively, M0, M1, M2 . . . $M_N$). A plurality of reward spring connections 1522, 1524, 1526, 1528, 1530, 1532, 1534, 1536 and 1538 are also shown in FIG. 15 with respect to the reward value 1516 and the reward springs 1520. The system 1500 is thus based by reward flow memories stored as a connection to an ultimate reward source, the "reward springs," at the time a memory is stored. The value of the connection is set by the instantaneous "reward value" such as the reward value 1516.

Note that whereas the reward value 1516 is constantly being computed, the reward springs 1518, 1520 provide a constant source of "reward flow", independent from the current reward state. At the time a memory (e.g., memories 1506, 1508, 1510 and/or 1512) is written, a connection, such as, for example, one or more of the connections 1522, 1524, 1526, 1528, 1530, 1532, 1534, 1536 and/or 1538, is formed between the reward springs 1518, 1520 and the watershed 1502. The value of the connection 1522, 1524, 1526, 1528, 1530, 1532, 1534, 1536 and/or 1538, is determined by the reward value 1516 at the time a memory (e.g., memories 1506, 1508, 1510 and/or 1512) is written.

Thus, the total reward flow at each memory 1506, 1508, 1510 and/or 1512 is a combination of both the activity of the reward springs 1518 and/or 1520 and the strength of the reward spring connection 1522, 1524, 1526, 1528, 1530, 1532, 1534, 1536 and/or 1538. By adjusting the relative activity of the reward springs 1518 and/or 1520, various degrees of influence can be exerted over the watershed 1502. This allows for a "change in priorities" during the life cycle of the watershed memory discussed herein, since the reward springs 1518, 1520 for each reward channel can be modulated independently. Thus, by increasing the activity of the novel reward springs 1518 and/or 1520 relative to the drive reward spring, the watershed memory discussed herein can be biased to explore rather than work.

We will assume that new memories are added at some regular time interval and that a memory is just a bit-pattern of the instantaneous memory encoding. Thus, each new memory is added, one after the other along the timeline. This process continues as long as the WM is active, thereby forming a precise temporal record of events. Along with the memory encoding bit pattern, the reward flow is written. The reward value is calculated as the difference between the expected reward and an actual reward, so that a high expected reward with no actual reward is encoded as punishment, and an expected punishment that led to no actual punishment is encoded as reward. Actual reward is computed via Reward Reflex Circuits, while the expected reward is computed from the time-delay of the first-response memory.

Figure 16:
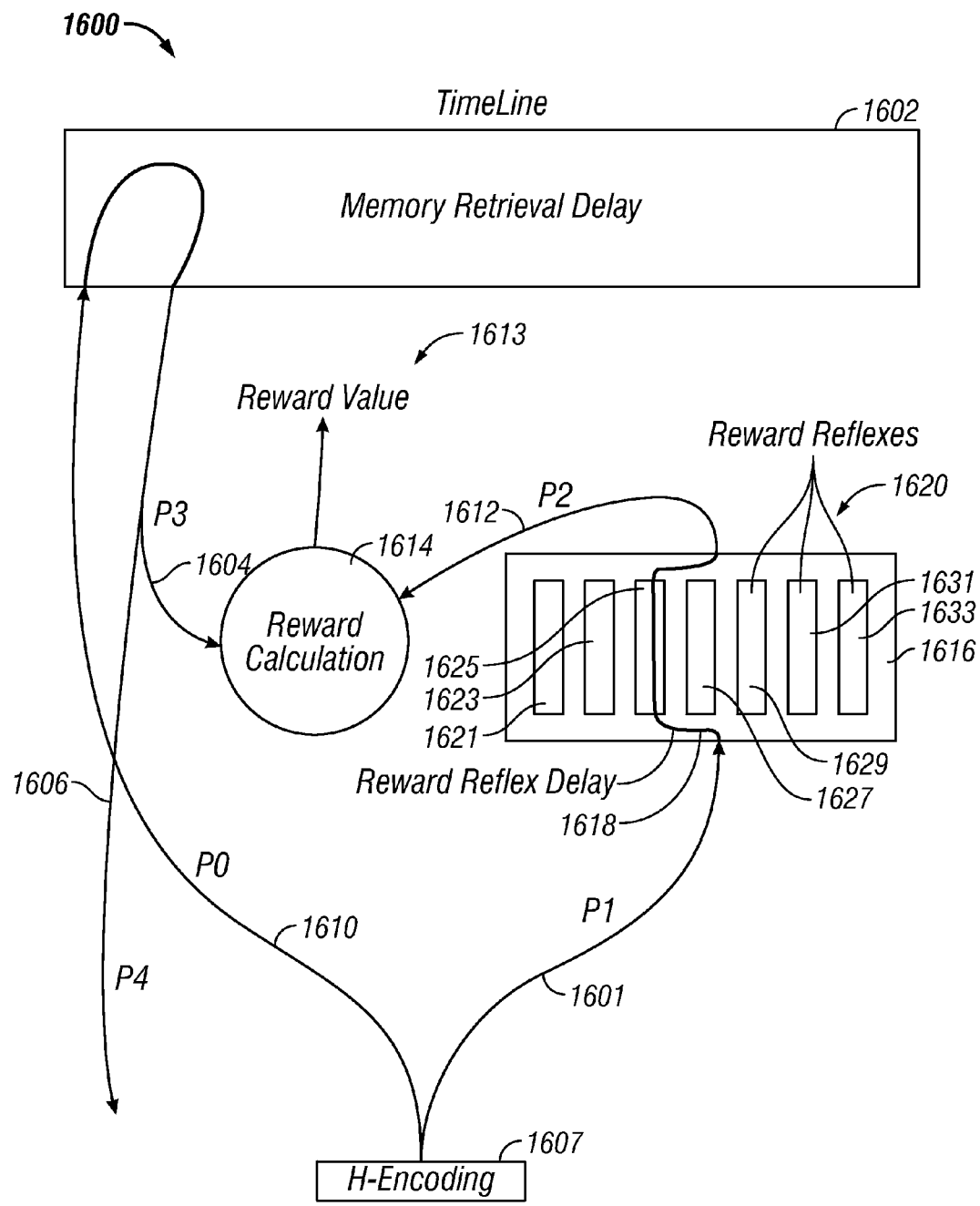
FIG. 16 illustrates a schematic diagram of the calculation of a reward value via a timing circuit, in accordance with the disclosed embodiments.

FIG. 16 illustrates a schematic diagram of a system 1600 for calculating a reward value via a timing circuit, in accordance with the disclosed embodiments. The system 1600 of FIG. 16 generally includes a calculation component 1614 for calculating a reward value 1613. A path 1604 (P3) and a path 1606 (P4) generally lead from a memory retrieval delay component 1602. The path 1604 leads to the calculation component 1614. A path 1610 (P0) leads from an H-Encoding component 1607 to the memory retrieval delay component 1602 (i.e., also referred to as timeline 1602). That is data from the H-Encoding component 1607 can be input to the memory retrieval delay component 1602. Similarly, a path 1601 (P1) leads from the H-Encoding component 1607 to a circuit 1616, which may be, for example, a collection of reward reflex circuits. The circuit 1616 includes a number of reward reflex circuits 1621, 1623, 1625, 1627, 1629, 1631, and 1633. An example of a group 1620 of such reward reflex circuits is also depicted in FIG. 16. A reward reflex delay line 1618 is shown as connected to reward reflex 1625 in the example depicted in FIG. 16. A path 1612 (P2) leads from the reward reflex delay line 1618 to calculation component 1614.

Using FIG. 16 as a guide one can follow through the general process of calculating a reward value, such as, for example, the reward value 1613. When an encoding is generated by the H-Encoding component 1607, data output from the H-Encoding component can be transmitted along the two paths 1610 and 1601 (respectively, P0 and P1). Path 1610 extends directly to the timeline 1602 for memory access; whereas the path 1601 leads to the circuit 1616, which may constitute one or more reward reflex circuits, such as, for example, the reward reflex circuits 1621, 1623, 1625, 1627, 1629, 1631, and/or 1633.

Each of the reward reflex circuits 1621, 1623, 1625, 1627, 1629, 1631, and 1633 is capable of monitoring the memory encoding output from the H-Encoding component for a specific regularity. Upon detection of this regularity, one or more of the reward reflex circuits 1621, 1623, 1625, 1627, 1629, 1631, and/or 1633 generates a pulse. Positive-going pulses are interpreted as pleasure (rewarding) and negative-going pulses are interpreted as punishment (non-rewarding). Since all circuits monitor the memory encoding in parallel, the generation of a reward pulse, for example, on the path 1612 (P2) (if it is generated at all) will occur at a constant delay following the arrival of the pulse on the path 1601 (P1). Such an occurrence can be referred to as reward reflex delay, or RR delay, as represented by the delay line 1618 in FIG. 16.

Meanwhile, as previously mentioned, the memory encoding was sent to the timeline for memory retrieval along P0. The time-to-first retrieval is inversely proportional to its activation, which is the sum of both contextual and reward components. After sufficient exploration of the environment the contextual match activation will stabilize at some near-maximal value. In other words, the longer the WM spends in an environment, the more likely it is that its context will be similar to a prior context. Thus, in familiar situations the contextual-activation is approximately constant and the variability in the activation is the result of only the reward activation. Thus, memories in the timeline with high reward watersheds will be highly active and will return a result faster than memories with low reward watershed.

Stated another way, the higher the expected reward (or punishment) the faster the response from the timeline. We can now see how the reward can be calculated via the timing of the pulses. Assume that t=0 denotes the start of memory 0, t=1 denotes the end of memory 0 (and the start of memory 1). Further assume that a prediction of punishment from the timeline triggers a positive-going pulse and vice-versa. At the start of each new memory the circuit is reset. Calculating the difference between the actual and expected rewards requires generating two pulses, $\theta_A$ and $\theta_P$, as can be seen from the configuration depicted in FIG. 17.

Figure 17:
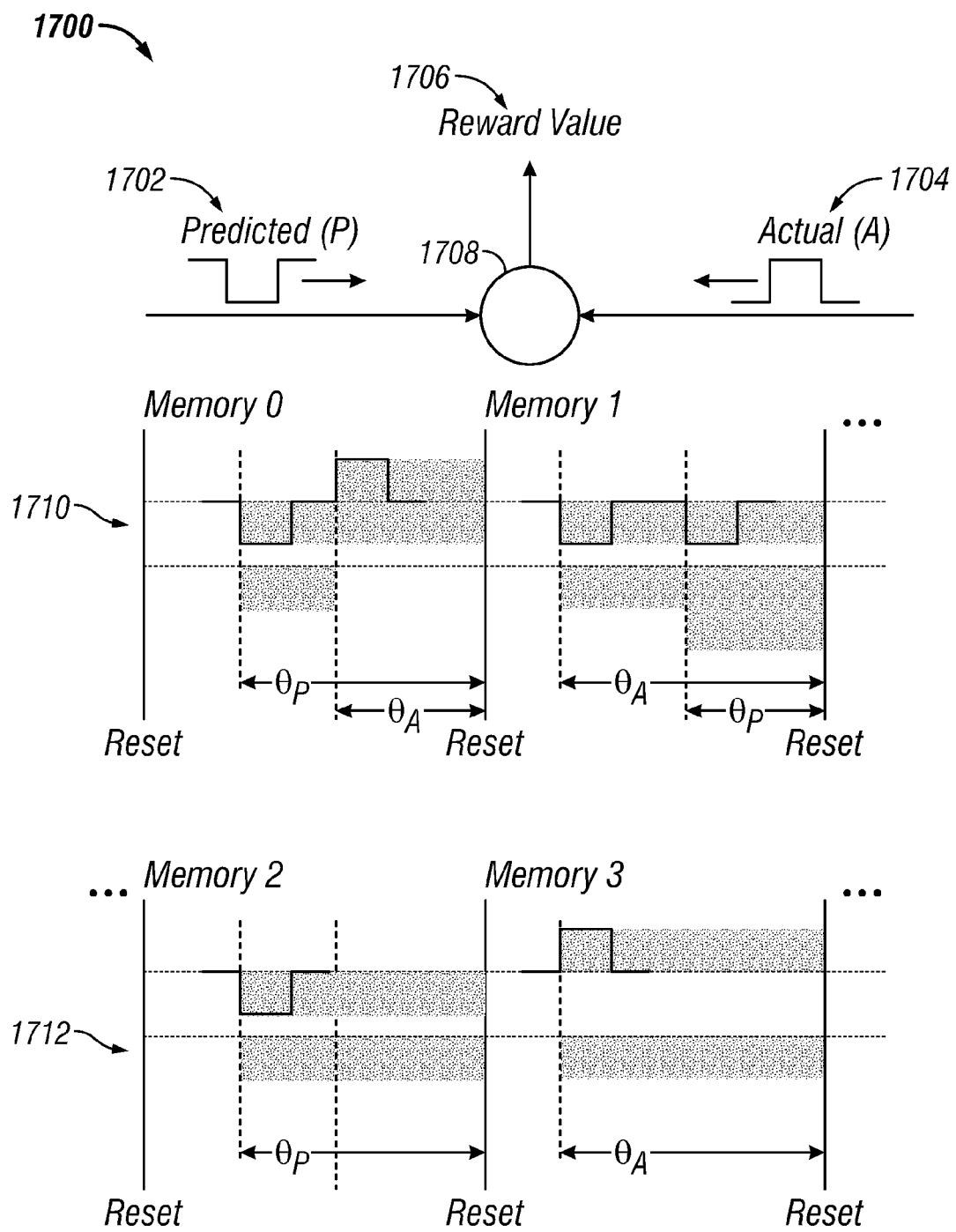
FIG. 17 illustrates a schematic diagram of the calculation of a reward value given a predicted reward and an actual reward via pulse timing, in accordance with the disclosed embodiments.

FIG. 17 illustrates a schematic diagram of a system 1700 for calculating a reward value 1706 given a predicted reward 1702 and an actual reward 1704 via pulse timing, in accordance with the disclosed embodiments. A calculation component 1708 receives data indicative of the predicted reward 1702 and the actual reward 1704 to generate a calculated reward value 1706. Graphs 1710 and 1712 respectively illustrate Memory 0, Memory 1 and Memory 2, Memory 3. Note that the reward value 1706 is also indicated generally by the variable R in FIG. 17. Additionally the predicted reward 1702 is indicated by the variable P, and the actual reward 1704 represented by the variable A.

As indicated in the system 1700 depicted in FIG. 17, the arrival and sign of the Timeline pulse, P, triggers $\theta_P$ to start and determines its sign, respectively. Likewise, the arrival and sign of the reward reflex pulse, A, triggers to $\theta_A$ start and determines its sign. The total reward can be then computed as the summation of $\theta_A$ and $\theta_P$ via the calculation component 1708 over the duration of the memory cycle as indicated by the equation below:

$$dW = \int_{M_0}^{M} \theta_A(t) + \theta_P(t)\, dt$$

This encoding of pulses can actually be stated simply as: Given some common reference oscillation used to measure a pulses phase, pulses with smaller phases are counted more than pulses with larger phases. Now that it is apparent how the difference between actual and predicted award can be generated via pulse timing, there remains the question of why it is generated in the first place.

Figure 18:
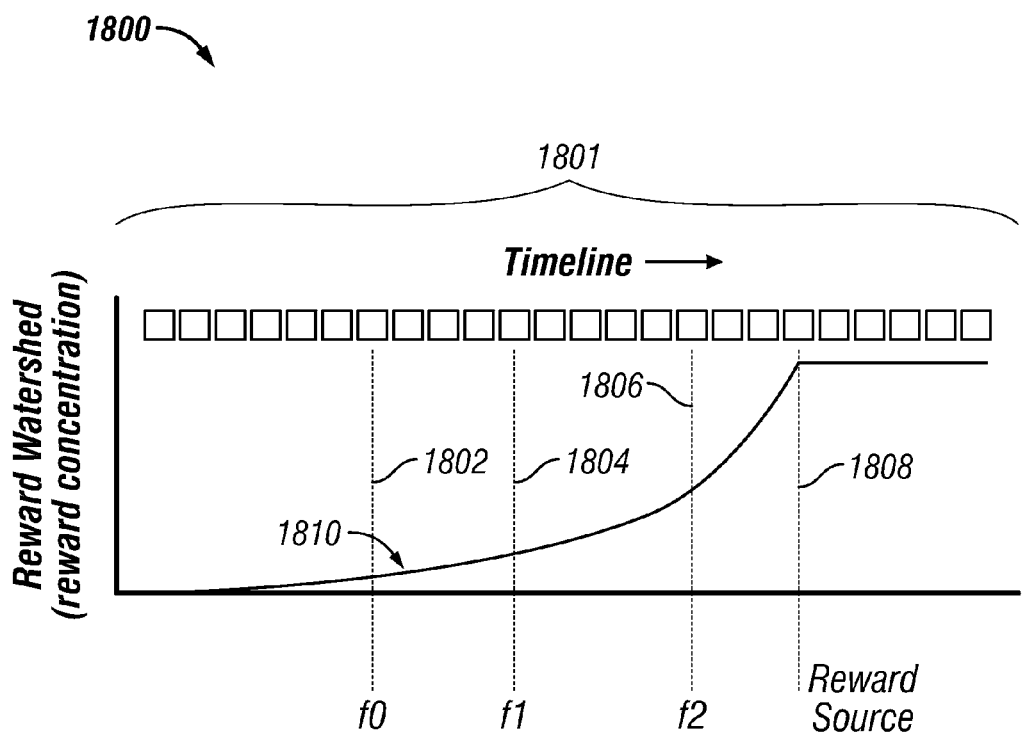
FIG. 18 illustrates a graph demonstrating how reward concentration decays down-timeline from a reward source, in accordance with this disclosed embodiments.

FIG. 18 illustrates a graph 1800 demonstrating how reward concentration decays exponentially down-timeline from a reward source, in accordance with this disclosed embodiments. Graph 1800 includes three flexes 1802, 1804, and 1806 (respectively, f0, f1, and f2 in FIG. 18). Assume that the three flexes 1802, 1804, and 1806 precede the occurrence of a reward 1808 (also referred to as simply "R"). Also assume that no predictions of reward 1808 have occurred.

When the reward flow has set up on the Watershed, it will be strongest at the memory of the flex 1806 (i.e., f2), then decaying down-timeline, as seen in FIG. 18. The result is that the flex 1806 will receive the highest reward flow, followed by the flex 1804 and then flex 1802 (respectively, f1 and then f0). Assume also that it was f0 and not f2 that caused the reward. Given a similar circumstance in the future, WM will now favor f2 over f0 and f1, which of course is not optimal. A mechanism must be in place to refine predictions, correcting for such a circumstance, and this is where the Reward Value comes in. In the future, when a similar context results in the retrieval of the f2 memory it will predict a high reward, but the reward will not come. The calculated reward (Reward Value) stored on the timeline will thus be a punishment in equal and opposite magnitude to the predicted reward.

FIG. 18 thus demonstrates that reward concentration decays down-timeline (i.e., timeline 1801) from the reward source 1808. It is not known at the time of the reward, what flex 1802, 1804 or 1806 caused the reward, a situation that must be resolved. Note that in FIG. 18 the line 1810 generally tracks the timeline 1801 with respect to the flexes 1802, 1804, 1806 and the reward source 1808 and so forth.

Figure 19:
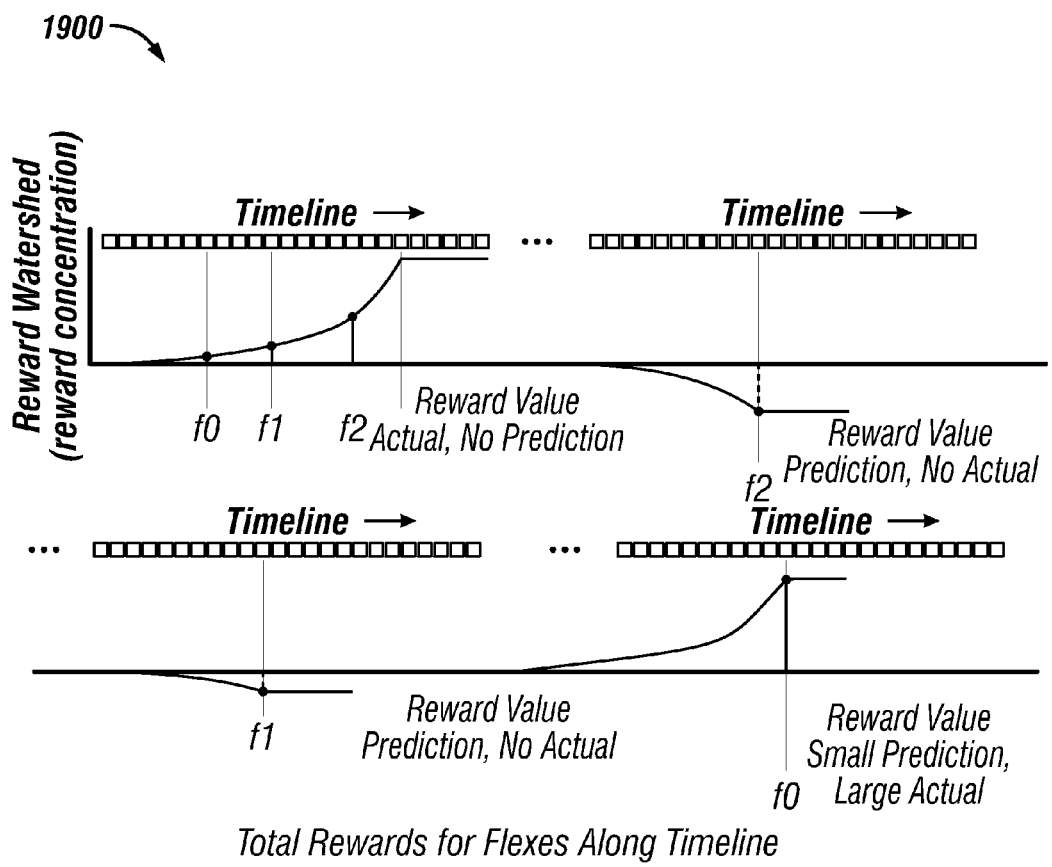
FIG. 19 illustrates a diagram depicting the summation of rewards along a timeline for each flex generated in a similar context and which converge to the true cause of the reward over time, in accordance with the disclosed embodiments.

Now, again in the future, when a similar context causes a search over all memories, the first (rewarded) and the second (punished) memories will be retrieved, The sum of these two signals will cancel, resulting in the f2 reward memory being nullified. This mechanism will repeat for f1, and so on, until the earliest reliable flex is found that generates a reward (f0). At this point, the prediction of reward will be an underestimate and the Reward Value will equal the difference between the actual and predicted. The sum of the two rewards will equal the actual reward. Thus, once a reliable source of reward is found, it is no longer encoded as a reward on the watershed. This is a very important feature because, if this were not the case, flexes that resulted in reward would be continuously reinforced to the point where they could not be unlearned quickly if the reward changed (that is, a reward was no longer received). Of note is the fact that the original unpredicted reward causes a clear preference and ordering of flexes for future flexes, given the same context. The WM will try the last flex before the reward, followed by the second to last, etc. This process can be seen in the configuration 1900 of graphs depicted in FIG. 19.

It is now clear how a reward value is calculated. Note that this process pre-supposed that an internal circuit is available to provide the "ground truth" for the existence of a reward. Whereas it may be obvious that a reward circuit could exist for such things as energy (sugar tastes good) or pain (over-extending a joint hurts), it may not be obvious that reward reflexes can be created to recognize reasonably complex sensory regularities external to a body. For example, the detection of facial expressions. We may replace something like a "smile detector" with a direct reward channel that enables a teacher to influence the WM system. This of course is not available to biology, which must rely solely on sensory regularities (such as smiles).

The Novelty reward channel requires that a measure of "newness" be computed and converted into a reward value. This is actually a simple task given a time-to-first-activation encoding. The longer it takes to retrieve a memory given an input context, the more novel that context is. Thus, the delay between the presentation of the context and the time-to-first response is a direct measure of novelty, which can be used to set the novelty reward flow for the subsequent memory. Since the longer the delay the more novel the pattern, this reward value circuit is actually only a slight variation of the previous maintenance reward circuit. Specifically, a Novelty reward is first assumed. When a memory is retrieved, the reward is terminated.

It is important to note that the current motor state (or equivalently the body state) forms a contribution to the total sensory state. Because of this, simply changing a body state to a new configuration, or moving the body in a new way, would be enough to illicit a reward. Interestingly, because it is never possible to experience the same context twice and have each context be considered new each time, the idea of computing a reward value based on predicted and actual reward cannot be applied. However, it is not needed. Recall that the last flex before the reward will receive the highest reward concentration along the watershed. This is ideal, because it is always the last flex before the generation of a novel reward that caused the novelty.

To better understand this concept, consider the metaphor of the river of possibility. Given a common starting point, each flex will take us up one tributary. Let's assume that the starting point is a robot on its back. As the robot flexes it will move in space. Each movement will cause a new body configuration, which will be sensed by both internal (proprioceptive) and external (vision, hearing, etc) sensors. If a flex leads to a new context, a novelty reward will be generated, which will propagate on the watershed and bias all flexes leading up to the flex that caused the novel reward. Assume that the robot succeeded in rolling halfway over, but fell back on its back, which caused a slight punishment via the maintenance reward channel. Since it now finds itself in its prior context, the flexes that led to the novel reward will be biased, and the robot will go through the same motions until it reaches the point right before it fell back, which we will call the "flex horizon". That is, a terminal branch representing an unexplored path. What has just happened is that the robot has explored one tributary of the "river of possibility".

Unlike an ordinary river, however, one distant fork led back to the starting point. Remember that this river is just a metaphor and does not exist in its entirety! The choice of tributary (flex) at each moment is re-constructed at each moment. Before memories are encoded, no memories exist to construct options. Of course, the question is then: "how does the robot ever generate a flex at all?" The answer is a Reflex, and that will be discussed shortly.

Return to the example of the robot learning to move, one path (flex) led to falling, and falling led to a punishment, so that path will now be inhibited. Over time, the Novel reward channel will guide the robot through an exploration of its control space while the maintenance channel will bias or inhibit those paths that lead to reward or punishment. The Novelty reward guides the robot to the flex horizon, and nothing more. That is, the novelty reward guides the robot to an area with high novelty density, but cannot in and of itself determines what actions to take once there. When in completely novel territory, the robot must rely on reflexes. If the context is close, but not exactly like prior contexts, then the robot can make use of this similarity, and hence the other reward dimensions to guide actions. What was new will never be new again, but the path that was taken to novelty is a path that most likely leads to more novelty. If it does not then it loops back to a previous starting point.

One remaining question is: In the absence of sensory stimuli, and thus reflexes, how could the WM learn to explore its space? The answer is that random noise within the system, in the absence of memories and reflexes, will force a flex. That is, the ultimate source of variation within the system is thermodynamic noise.

Beyond just exploring the world safely, there remains the problem of work. What would drive a WM to participate in the same behaviors every day, particularly behaviors that could lead to possible punishment? This predicament becomes particularly evident in animals that must endure a long period of child-rearing. In a hostile world, a young and helpless infant is a liability to a parent that could lead to the parent's death. What keeps the parent from simply abandoning its young for a life of increased leisure? In a technological setting, a robot that simply looked out for its own best-interest would be useless. Without the Drive reward channel, there is no motivation to move beyond self-maintenance and exploration.

The Drive reward is more complex than either the Novel or Maintenance reward, but it is quite powerful. Suppose that a reward could be retroactively attached to a memory. In other words, let us assume that a specific WM was controlling a robot in a workshop (the robot). Over a period of time the robot moves around the shop, forming memories of objects in the room, simply taking stock of what's there and being primarily guided by its novelty reward dimension. Now, after the memories have been formed, suppose we did the following: We take an object, for example a hammer, and present it to the robot. The robot accesses its memories and generates a list of all contextual matches. It then forms a reward connection to those memories, setting up a reward flow along its watershed that flows down-timeline from all memories of the hammer.

Even though the hammer was never associated with reward in the past, its flexes will be bias in favor of those flexes that lead to the observation of the hammer in the past. Furthermore, suppose that the Drive reward channel could be used to form new reward flows so that a [predicted-actual] reward value could be formed. At first, all prior memories of the hammer will become reward sources. The strongest reward source would be a spatial location with the most memories of the hammer, that is, where it "usually is", or it would be the source closest (in terms of flexes needed to get there). As the robot's flexes guide it to the strongest source, predictions are being made along the way. If no hammer is detected, a "trail" of punishment is formed, which balances the false-predictions and nullifies the reward trace.

The result is that the robot goes to the strongest source first, then the second strongest, etc, remembering where the hammer was not, until it finds the hammer. It is possible to do better than this if the memory encoding includes a measure of time. Those memories of the hammer that occurs closest in time will be more highly active, thus biasing the most recent memories over the older memories. Since the memory encoding should capture a categorical measure, the search would proceed from hammers to "hammer-like things" if a hammer was not found. This example should impress how WM is more of a resource to a developer of control systems rather than an ultimate solution, since WM can be used in many ways.

If we further include the ability to form associations between sensory regularities in the memory encoding, we are one step further to a truly capable control system. For example, we may have as our "goal-state" not a hammer but something much more difficult to attain. A search over prior memories may return just a few examples, and the reward traces may not reach far enough down the watershed to bias a memory that is similar to the present context. Remember, for a memory to be highly active it must be both contextually relevant and also rewarded. If the application of drive reward does not bias a memory that is similar in context to the present context, it will likely not be selected.

Assume, however, that the sensory regularity in question was associated with other regularities. These (secondary) regularities can be rewarded, and so on, until a memory with high contextual match is rewarded. The robot would then take actions that lead it to the association, the idea of course being that if the primary goal cannot be attained, its primary goal may be found with its associations. It should be apparent to the reader that his or her brain possesses the ability to link reward with arbitrary secondary objects simply by taking money as an example. Money, after all, has little to no direct practical use (i.e., eating money is not beneficial)

The important point is that the Drive reward channel should be dynamic and associative. Given a starting point and an (arbitrary) target reward source, the drive reward system can be used to find a set of memories (and flexes) that will connect the present context to the target goal. In other words, the drive reward system can be used to generate goal-oriented behavior, where all prior memories, actions and consequences can be brought to bear on the goal, which can be changed dynamically.

Figure 20:
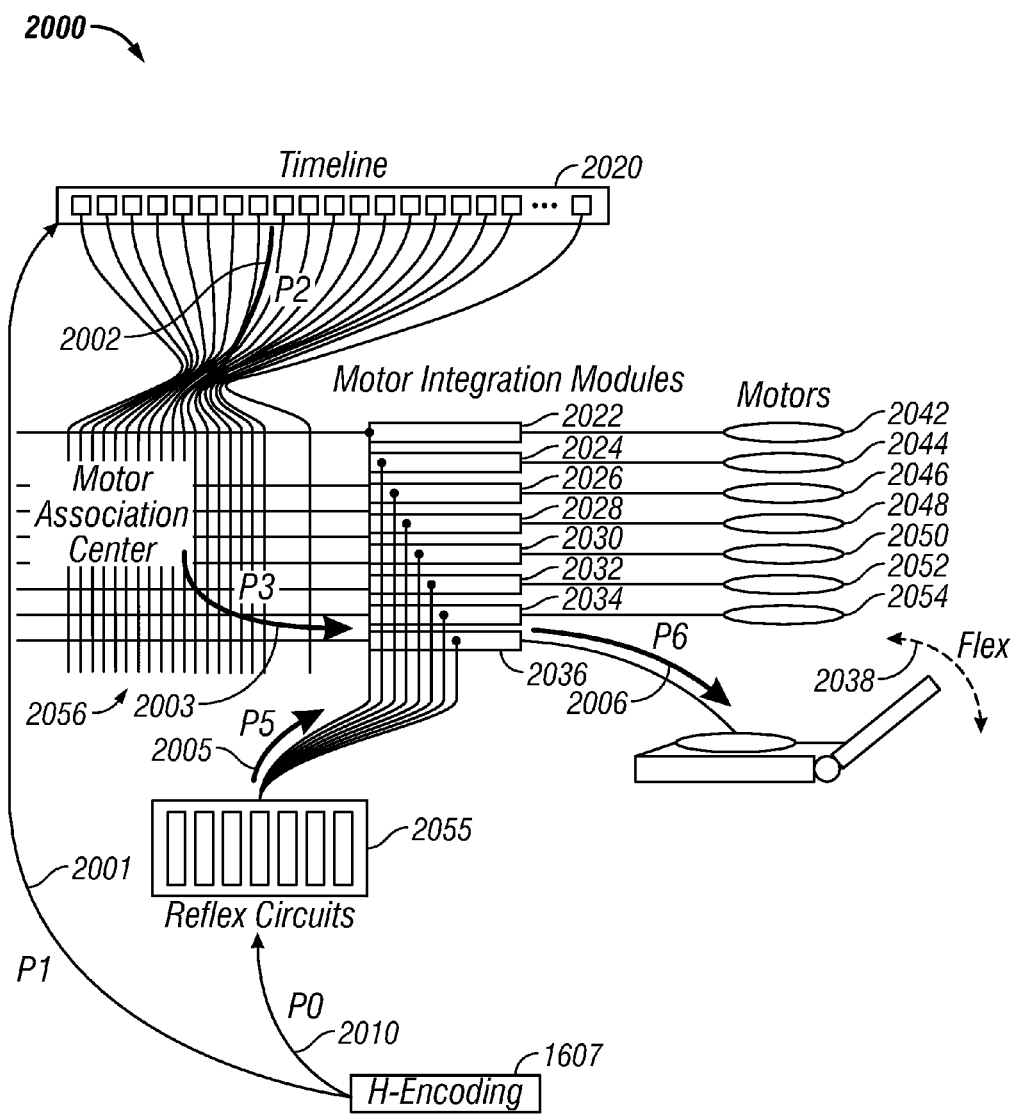
FIG. 20 illustrates a schematic diagram of motor outputs resulting from the combination of reflexes and memory retrievals, in accordance with the disclosed embodiments.

FIG. 20 illustrates a schematic diagram of outputs of motors 2042, 2044, 2046, 2048, 2050, 2052, and 2054 resulting from the combination of reflexes and memory retrievals, in accordance with the disclosed embodiments. As indicated in FIG. 20, outputs of motors 2042, 2044, 2046, 2048, 2050, 2052, and 2054 result from the combination of reflexes and memory retrievals. In general, memory encoding is sent along path 2010 (also shown as P0 in FIG. 20) and path 2001 (also shown as P1 in FIG. 20) from the H-Encoding component 1607 to the reflex circuits 2055 and the timeline 2020, respectively. The timeline 2020 returns the best-match memories along path(s) 2002 (also shown as P2 in FIG. 20), which have been previously associated with the motors that were active during formation of the memory via the Motor Association Center. In the absence of any recalled memories, the reflex circuits 2055 will exert control. Reflexes leading to punishment will be inhibited and those leading to reward will be enforced. Over time, reflexes will be replaced with "pre-flexes" as discussed herein. Path(s) 2005 (also shown as P5 in FIG. 20) lead from the reflex circuits 2055 to respective motor integration modules 2022, 2024, 2026, 2028, 2030, 2032 and 2034 whose output results in the respective motor outputs 2042, 2044, 2046, 2048, 2050, 2052, and 2054. A path 2006 (also shown as P6 in FIG. 20) leads from motor integration module 2036 to the "flex" 2038. Additionally a path 2003 (also shown as P3 in FIG. 20) leads from the motor association center 2056 to the motor integration modules 2022, 2024, 2026, 2028, 2030, 2032 and 2034.

It is now apparent how rewards are calculated and memories are selected. It may not be clear, however, how a motor command is actually generated from the combined output of timeline memories. Remember that the process for assigning a reward to a particular memory occurs over time after successive actions. The recollection of a memory does not directly generate a flex, such as flex 2038. As discussed above, more than one memory may be selected, so that a later memory counter-acts the first memory. Since the activation of the timeline returns the most active, followed by the second most active, and so on, if one waited long enough, every memory would be returned. Of course one cannot afford to wait because another memory must be stored and acted on. It is also not energetically optimal to access every memory at every moment. Such a configuration would bind the total time for waiting for memory responses. If no memories are retrieved in the allotted time, then a motor response cannot be generated (or inhibited). Before all the memory responses can be combined, it is required that each memory be associated with the motor response that was active when a memory was being written to the timeline. This requires a Motor Association Center (MAC) such as MAC 2056, which can be utilized to route the accessed memories to their appropriate motor command.

Once signals pass through the MAC 2056, such signals can be routed to a specific Motor Integration Module, such as, for example, one or more of the motor integration modules 2022, 2024, 2026, 2028, 2030, 2032 and 2034, which sum the signals and arrives at the actual motor response. Each Motor Integration Module (MIM) 2022, 2024, 2026, 2028, 2030, 2032 and 2034 is respectively responsible for controlling the output of a motor.

Recall that the reward value was calculated during a set period of time between the writing of one memory and the next. This period of time also forms a window for which all motor commands are computed. Each MIM 2022, 2024, 2026, 2028, 2030, 2032 and 2034 can be reset at the beginning of each period while outputting the result of the last period. An output generally includes a pulse sent to a motor, such as, one of the motors 2042, 2044, 2046, 2048, 2050, 2052, and 2054, for example, one of which will result in the "flex" 2038 depicted in FIG. 20. As pulses arrive from the MAC, they are integrated by the MIMs. Pulses act to excite (or inhibit for negative-going pulses) the MIMs. As in the reward circuit, the mechanism for summing pulses is based on the phase relative to the memory cycle. The smaller the phase, the more it is counted. At the end of each period, all MIM's exceeding a threshold activates their respective motors.

The question still remains, how WM could generate a motor command if no prior memories exit that link with a motor command. After all, before a memory can be routed to a MIM it must have previously been associated with an active motor, which of course requires that the motor was active. Stated another way, before movements can be analyzed and directed, there first must be movements to analyze. "Movements" has been substituted for "flex" here for clarity of example. Abstractly, a flex is simply a control action that may or may not affect the environment.

Of course, in the most practical sense of a robot, a flex is the activation of muscle, which results in movement. Consider the case of moving an arm to pick up an object. Before WM can piece together all the movements to form the behavior, the movements must have occurred in the past. The original flexes, upon which all preflexes are based, must be contained within a set of hardwired reflexes or else originate from thermal noise. This extends not only to a movement, but to its force as well. This in no way means that all movements must be hardwired, start to finish, but rather that a sufficient base set of elemental reflexes exists to construct a movement and that these movements can be initiated. Initiation of a movement before memories have been acquired can arise from sensory regularities and state variables or a random signal generator (thermal noise).

It is certainly possible that only a random signal generator is needed to initiate movement because, given some starting point, all possible movement will eventually be explored. So long as only small movements are required before some sort of reward feedback, random movement generation could suffice. However, some, if not all, foundational movements are still rather complex. For example, consider a robotic arm intended to pick up objects. First, the arm must explore its space. This alone is a complex act if the arm contains many degrees of freedom, not to mention the additional tasks of navigating the (open) hand to an object, closing the hand around the object, and moving the (closed) hand to another position. It would take an extremely long time to acquire this movement sequence outside of incredibly fine-grained reward signals. However, we can do much better than random. For example, consider just some of the reflexes available to the human infant at birth:

Tonic Neck Reflex—Baby placed on back will assume a fencer's pose: She'll outstretch the arm and leg in the direction she's facing, curling the opposite arm and leg inward.

Palmer Grasp—Tickling Baby hand will cause hand to clench hard.

Rooting Reflex—An object placed in an infant's hand will result in the hand grasping (Palmer grasp), following by a movement to the mouth, regardless of initial hand position.

First, the Tonic Neck Reflex initiates an extend arm. Second, the Palmer Grasp will cause the hand to close around an object felt on the palm. Third, the Rooting Reflex will cause the object in hand to move to the mouth. Thus, the addition of only three reflexes can vastly increase the chance that an action will occur. The set of reflexes available to the WM will play a very substantial role on the later development. Given two sets of reflexes, R1 and R2, where both are capable of generating every possible movement sequence given unlimited time, both will converge on the same optimal solution for some task eventually. However, the time to convergence could take 5 minutes or 5,000 years, depending on the set of reflexes available.

Until now we have ignored some very useful internal state variables. At any moment, by simply looking at the time rate of change of the reward regulators we may make a generally-correct assessment about the state of the WM in its environment. If, for example, the maintenance reward regulator is falling (becoming less active) we may say generally that something has occurred (or is predicted to occur) which caused (will cause) the safety of the WM to be compromised. Let us refer to this as the "M-falling" state.

In total, for three reward channels, each in a rising or falling state, we have 8 distinct states, where each state says something about the current condition of the WM. For example, if Novelty is rising and Maintenance is falling, we may generally say the WM is in a new situation and is not safe (or is predicting pain). Or perhaps Novelty is rising and Maintenance is rising, which means the WM has just discovered something new and good (or anticipates something good). A designer could thus link each one of these states with a motor response. Intuitively, these states bear striking similarity to an emotional state. As such, it is not difficult to see how they could be mapped to facial expression to aid in group communication. For example, if the actions of agent A caused agent B's maintenance reward levels to increase, this could cause a state which could illicit facial expressions of joy or happiness. If the state of joy resulted in a smiling reflex, then this smile could be used as the basis of a Drive reward in agent A. If the detection of a smile caused an increase in drive reward, the actions that A performed to cause B to smile will be reinforced. A will do what B wants and B will do what A wants. Thus, mapping the "reward states" to facial expression offers a direct and profoundly natural method to interact with robotic systems. That is, the robot may be endowed with the ability to detect our facial expressions (emotional state) and use this as a queue for the reinforcement of its behavior.

Likewise, the reward states of the robot can be mapped to a facial configuration that a human may use to ascertain the state ("emotion") of the robot. As just one example, if a robot performed an action that led to the compromise of a human's safety, either real or predicted, the human would generate either an anger or fear facial expression. This expression would be detected by the robots reward reflex circuitry, interpreted as a punishment, and thus prevent the robot from taking those actions in the future.

As previously discussed, before memories can be used as the basis of flexes, flexes must have already occurred, and this includes the force of the flex. It is not sufficient to learn just a sequence of motor movements. Walking, for example, requires that both the timing of the sequences, but also their force, is controlled: without adequate force, a robot would collapse under its own weight, but too much force and injury could result. The problem is how to test variations in force.

A solution to this problem is that the "reward state" is used to modulate the force of a reflex. When the robot is in one reward state, movements are taken with increasing force. When in another state less force is used. The abundance of reward states (e.g., emotional states) can thus be used to vary the force of the reflexes. A simple example will demonstrate this concept. Suppose the robot is tasked with hitting nails with a hammer and it had learned this task for a soft wood. After successfully driving the nail into the wood a reward is given. The wood is then changed from soft to hard. The robot attempts to drive the nail into the wood, predicting a reward. The force is insufficient and the robot fails. The failed prediction of reward creates an "angry" state that increases the force of flexes. The nail is driven into the wood, the reward is achieved and the new behavior is learned. Taken quite literally, the robot simply "tries harder". As another example, we could suppose that a robot has failed to attain a predicted drive reward, which could be linked to a "sad" state that causes a frown. An observer could detect this state, figure out what is wrong, and help the robot.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A watershed memory system, said system comprising:
   a sensory encoder for generating a condensed encoding associated with at least one circumstance received from an external environment;
   a memory associated with a regulator for recognizing said condensed encoding and activating at least one emotional spring in accordance with a predefined set of instructions, wherein said at least one emotional spring is capable of transmitting a plurality of signals;
   a fractal moment sheet comprising at least one moment arranged in a fractal branching structure and connected locally via a plurality of timelines, wherein said fractal moment sheet generates at least one watershed based on said plurality of signals thereby generating a behavior for said at least one circumstances; and
   a moment writer for configuring a location associated with said at least one moment on said fractal moment sheet wherein said moment writer writes and overwrites said at least one moment according to availability associated with said fractal moment sheet.

2. The system of claim 1 further comprising a plurality of sensors for converting energy associated with said external environment into an electrical signal.

3. The system of claim 1 further comprising a plurality of activation signals generated by encoding a moment activation magnitude from said at least one moment.

4. The system of claim 1 further comprising a reaction relay for receiving said plurality of activation signals wherein said reaction relay links said at least one moment with an action state.

5. The system of claim 4 further comprising a motor encoder associated with said reaction relay wherein said reaction relay provides a synaptic link between said at least one moment and said motor encoder.

6. The system of claim 2 further comprising a plurality of connections associated with said memory.

7. The system of claim 1 wherein said regulator generates and maintains a plurality of watershed levels associated with said at least one circumstance.

8. The system of claim 5 wherein said motor encoder is capable of executing a series of motor sequences required by said action state.

9. The system of claim 1 wherein said memory records said at least one circumstance in said fractal moment sheet in order to learn an expected response of action.

10. The system of claim 1 further comprising a plurality of connections associated with said memory.

11. The system of claim 10 wherein said plurality of connections includes a non-plastic connection.

12. The system of claim 10 wherein said plurality of connections includes a plastic connection.

13. The system of claim 10 wherein said plurality of connections includes a modulatory connection.

14. A watershed memory system, said system comprising:
   a sensory encoder for generating a condensed encoding associated with at least one circumstance received from an external environment;
   a memory associated with a regulator for recognizing said condensed encoding and activating at least one emotional spring in accordance with a predefined set of instructions, wherein said at least one emotional spring is capable of transmitting a plurality of signals;
   a fractal moment sheet comprising at least one moment arranged in a fractal branching structure and connected locally via a plurality of timelines, wherein said fractal moment sheet generates at least one watershed based on said plurality of signals thereby generating a behavior for said at least one circumstance;
   a plurality of sensors for converting energy associated with said external environment into an electrical signal; and
   a moment writer for configuring a location associated with said at least one moment on said fractal moment sheet wherein said moment writer writes and overwrites said at least one moment according to a space availability associated with said fractal moment sheet.

15. The system of claim 14 further comprising:
   a plurality of activation signals generated by encoding a moment activation magnitude from said at least one moment; and
   a reaction relay for receiving said plurality of activation signals wherein said reaction relay links said at least one moment with an action state.

16. The system of claim 15 further comprising a motor encoder associated with said reaction relay wherein said reaction relay provides a synaptic link between said at least one moment and said motor encoder.

17. The system of claim 15 further comprising a motor encoder associated with said reaction relay wherein said reaction relay provides a synaptic link between said at least one moment and said motor encoder.

18. The system of claim 14 wherein said regulator generates and maintains a plurality of watershed levels associated with said at least one circumstance and wherein said motor encoder is capable of executing a series of motor sequences required by said action state.

19. A watershed memory system, said system comprising:
   a sensory encoder for generating a condensed encoding associated with at least one circumstance received from an external environment;
   a memory associated with a regulator for recognizing said condensed encoding and activating at least one emotional spring in accordance with a predefined set of instructions, wherein said at least one emotional spring is capable of transmitting a plurality of signals;
   a fractal moment sheet comprising at least one moment arranged in a fractal branching structure and connected locally via a plurality of timelines, wherein said fractal moment sheet generates at least one watershed based on said plurality of signals thereby generating a behavior for said at least one circumstance;
   a plurality of sensors for converting energy associated with said external environment into an electrical signal;
   a plurality of activation signals generated by encoding a moment activation magnitude from said at least one moment;
   a reaction relay for receiving said plurality of activation signals wherein said reaction relay links said at least one moment with an action state; and
   a moment writer for configuring a location associated with said at least one moment on said fractal moment sheet wherein said moment writer writes and overwrites said at least one moment according to a space availability associated with said fractal moment sheet.

20. The system of claim 19 wherein said memory records said at least one circumstance in said fractal moment sheet in order to learn an expected response of action.

* * * * *